US012767355B2

(12) United States Patent
Schaefer et al.

(10) Patent No.: US 12,767,355 B2
(45) Date of Patent: Oct. 20, 2026

(54) METHODS OF CHARACTERIZING BONDLINE INTEGRITY OF STRUCTURAL ASSEMBLIES, METHODS OF ESTABLISHING REDUCED PROOF PRESSURE DIFFERENTIALS FOR PROOF TESTING A STRUCTURAL ASSEMBLY THAT INCLUDES A BONDLINE, METHODS OF PROOF TESTING A STRUCTURAL ASSEMBLY, AND ACOUSTIC EVALUATION SYSTEMS

(71) Applicant: The Boeing Company, Arlington, VA (US)

(72) Inventors: Joseph D. Schaefer, Richmond Heights, MO (US); Brian P. Justusson, Saint Charles, MO (US)

(73) Assignee: The Boeing Company, Arlington, VA (US)

(*) Notice: Subject to any disclaimer, the term of this patent is extended or adjusted under 35 U.S.C. 154(b) by 185 days.

(21) Appl. No.: 18/749,132

(22) Filed: Jun. 20, 2024

(65) Prior Publication Data

US 2025/0388338 A1 Dec. 25, 2025

(51) Int. Cl.
*B64F 5/60* (2017.01)
*G01M 5/00* (2006.01)

(52) U.S. Cl.
CPC ............. *B64F 5/60* (2017.01); *G01M 5/0033* (2013.01); *G01M 5/0066* (2013.01)

(58) Field of Classification Search
USPC ............................................................ 73/587
See application file for complete search history.

(56) References Cited

U.S. PATENT DOCUMENTS

| | | | | |
|---|---|---|---|---|
| 5,841,034 | A * | 11/1998 | Ball | G01M 11/086 73/800 |
| 8,812,251 | B2 * | 8/2014 | Ihn | B29C 65/483 702/182 |
| 9,267,906 | B2 * | 2/2016 | Anway | B29C 65/5021 |
| 9,567,104 | B2 * | 2/2017 | Sweers | B29C 65/5021 |
| 9,989,501 | B2 * | 6/2018 | Tat | G01N 29/14 |
| 10,564,130 | B2 * | 2/2020 | Tat | G01N 29/46 |
| 2021/0389496 | A1 * | 12/2021 | Rodriguez Serrano | G01K 11/3206 |

FOREIGN PATENT DOCUMENTS

| | | | | |
|---|---|---|---|---|
| EP | 3500849 B1 * | 6/2023 | | G01N 19/04 |

* cited by examiner

*Primary Examiner* — Walter L Lindsay, Jr.
*Assistant Examiner* — Warren K Fenwick
(74) *Attorney, Agent, or Firm* — Kolitch Romano Dascenzo Gates LLP

(57) ABSTRACT

Methods of characterizing bondline integrity of structural assemblies, methods of establishing reduced proof pressure differentials for proof testing a structural assembly that includes a bondline, methods of proof testing a structural assembly, and acoustic evaluation systems are disclosed herein.

20 Claims, 13 Drawing Sheets

METHODS OF CHARACTERIZING BONDLINE INTEGRITY OF STRUCTURAL ASSEMBLIES, METHODS OF ESTABLISHING REDUCED PROOF PRESSURE DIFFERENTIALS FOR PROOF TESTING A STRUCTURAL ASSEMBLY THAT INCLUDES A BONDLINE, METHODS OF PROOF TESTING A STRUCTURAL ASSEMBLY, AND ACOUSTIC EVALUATION SYSTEMS

FIELD

The present disclosure relates generally to methods of characterizing bondline integrity of structural assemblies, to methods of establishing reduced proof pressure differentials for proof testing a structural assembly that includes a bondline, to methods of proof testing a structural assembly, and to acoustic evaluation systems.

BACKGROUND

Structural assemblies may include a bondline between dissimilar materials. It may be desirable to test such structural assemblies such as to verify integrity of the structural assemblies. However, it may be difficult to validate structural integrity of certain structural assemblies utilizing non-destructive inspection equipment and/or via visual inspection. As an example, it may be difficult to view certain regions of the bondline and/or certain undesirable bondline conditions may not be detectable by the non-destructive inspection equipment. In certain circumstances, proof testing may be utilized. Proof testing may involve validating functionality and/or integrity of the structural assemblies under conditions that approximate, represent, and/or exceed real-world conditions experienced during operative use thereof. While effective, such proof testing may be expensive to perform and may cause damage when the structural integrity of the structural assemblies is insufficient to withstand the proof testing conditions. As an example, proof testing of aircraft canopies generally involves installing the aircraft canopy on an aircraft, and insufficient structural integrity may result in damage not only to the aircraft canopies but also to one or more other components of the aircraft. Thus, there exists a need for improved methods of characterizing the bondline integrity of structural assemblies, methods of establishing reduced proof pressure differentials for proof testing a structural assembly that includes a bondline, methods of proof testing a structural assembly, and acoustic evaluation systems.

SUMMARY

Methods of characterizing bondline integrity of structural assemblies, methods of establishing reduced proof pressure differentials for proof testing a structural assembly that includes a bondline, methods of proof testing a structural assembly, and acoustic evaluation systems. The methods of characterizing bondline integrity include, for each baseline structural assembly of a plurality of baseline structural assemblies, receiving baseline acoustic emission data, filtering the baseline acoustic emission data, and applying an unsupervised learning algorithm. The baseline acoustic emission data is generated during validation of each baseline structural assembly. Each baseline structural assembly includes a corresponding baseline bondline, and at least a subset of the baseline acoustic emission data is generated during a physical change to the corresponding baseline bondline. The filtering the baseline acoustic emission data includes filtering to generate filtered baseline acoustic emission data that includes a baseline bondline-proximate subset of the baseline acoustic emission data, which is generated relatively proximate the corresponding baseline bondline, and excludes a baseline bondline-distal subset of the baseline acoustic emission data, which is generated relatively distal the corresponding baseline bondline. The applying of the unsupervised learning algorithm includes applying the algorithm to the filtered baseline acoustic emission data to generate a classification dataset. The classification dataset identifies at least one characteristic of the filtered baseline acoustic emission data that is indicative of the physical change to the corresponding baseline bondline during validation of each baseline structural assembly.

The methods of establishing the reduced proof pressure differential include establishing an assessment pressure differential between an interior region of an assessment structural assembly and an exterior region of the assessment structural assembly. During the establishing of the assessment pressure differential, these methods also include acoustically monitoring the assessment structural assembly to generate assessment acoustic emission data. These methods further include filtering the assessment acoustic emission data to generate filtered assessment acoustic emission data. The filtered assessment acoustic emission data includes an assessment bondline-proximate subset of the assessment acoustic emission data and excludes an assessment bondline-distal subset of the assessment acoustic emission data. These methods also include applying a supervised learning algorithm trained on a classification dataset to the filtered assessment acoustic emission data to identify characteristics of the filtered assessment acoustic emission data indicative of a physical change to an assessment bondline of the assessment structural assembly. These methods also include repeating the establishing, the acoustically monitoring, the filtering, and the applying at a plurality of distinct assessment pressure differentials to generate a proof pressure differential database. The proof pressure differential database includes each assessment pressure differential of the plurality of distinct assessment pressure differentials and correspondingly identified characteristics of corresponding filtered assessment acoustic emission data indicative of the physical change to the assessment bondline. These methods further include selecting the reduced proof pressure differential for the structural assembly based, at least in part, on the proof pressure differential database.

The methods of proof testing the test structural assembly include testing at a reduced proof pressure differential. These methods include establishing the reduced proof pressure differential between an interior region of the test structural assembly and an exterior region of the test structural assembly. During the establishing the reduced proof pressure differential, these methods also include acoustically monitoring the test structural assembly to generate test acoustic emission data. These methods further include filtering the test acoustic emission data to generate filtered test acoustic emission data that includes a test bondline-proximate subset of the test acoustic emission data and excludes a test bondline-distal subset of the test acoustic emission data. These methods also include applying a supervised learning algorithm trained on a classification dataset to the filtered test acoustic emission data to identify characteristics of the filtered test acoustic emission data indicative of a physical change to the test bondline. These methods further include predicting the physical change to the test bondline when the filtered test acoustic emission data includes characteristics indicative of the physical change to the test bondline.

The acoustic evaluation systems, which also may be referred to herein as solid wave mechanics evaluation systems, are utilized for acoustically evaluating a structural assembly that includes a bondline. The systems include a validation structure configured to apply a validation condition to the structural assembly. The systems also include an acoustic sensing system that includes a plurality of acoustic sensors configured to be positioned in acoustic communication with the structural assembly and to generate acoustic emission data indicative of acoustic emissions from the structural assembly during validation of the structural assembly via the validation condition. The systems further include an analyzer module programmed to receive the acoustic emission data and to filter the acoustic emission data to generate filtered acoustic emission data that includes a bondline-proximate subset of the acoustic emission data generated relatively proximate the bondline and excludes a bondline-distal subset of the acoustic emission data generated relatively distal the bondline.

DESCRIPTION

Figure 1:
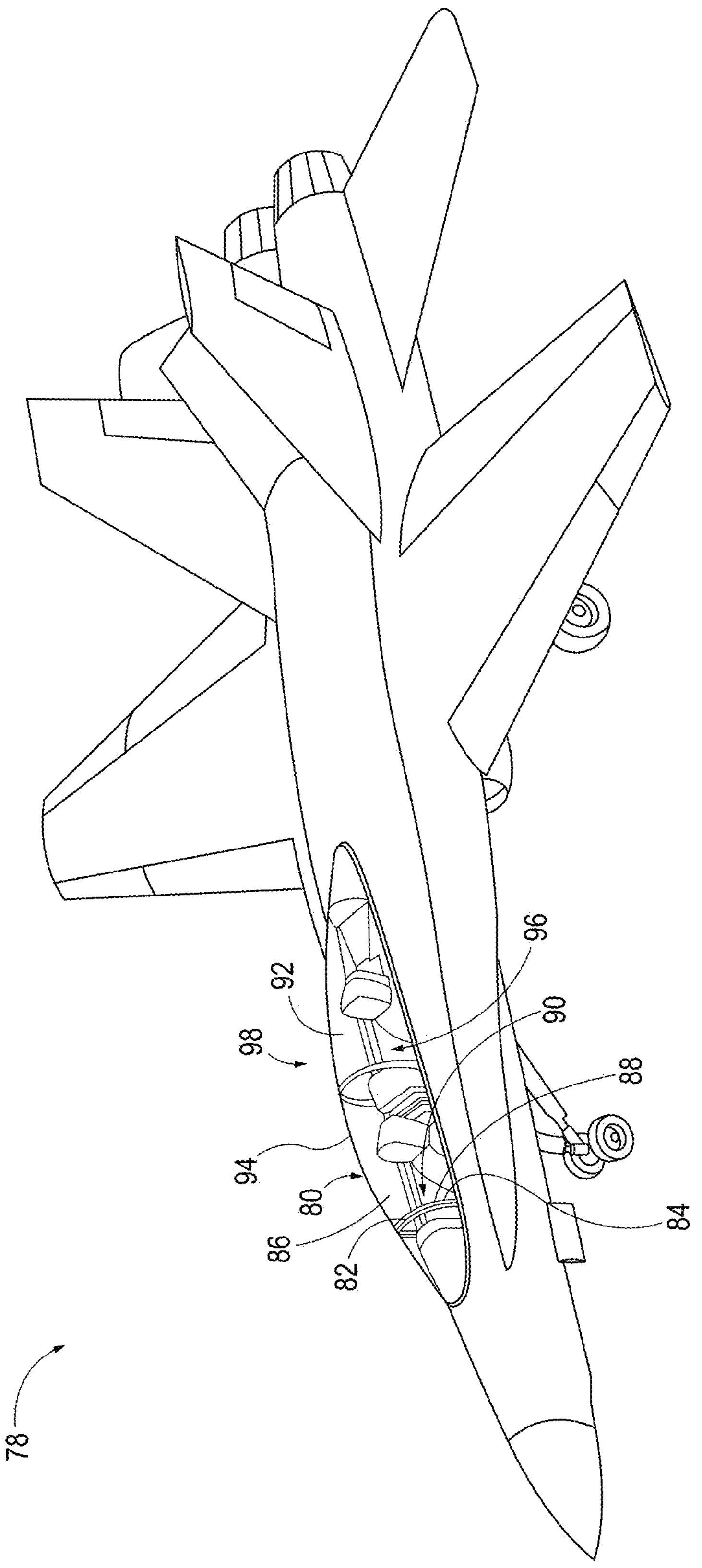
FIG. 1 is a schematic illustration of an example of an aircraft that may include a structural assembly, in the form of an aircraft canopy, that may be utilized with methods according to the present disclosure.

FIGS. 1-17 provide illustrative, non-exclusive examples of acoustic evaluation systems 10, of methods 100, 200, and/or 300, of structural assemblies 80 that may be utilized with systems 10 and/or with methods 100, 200, and/or 300, and/or of data that may be generated by systems 10 and/or by methods 100, 200, and/or 300, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

In general, elements that are likely to be included in a given (i.e., a particular) embodiment are illustrated in solid lines, while elements that may be optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an example of an aircraft 78 that may include a structural assembly 80, in the form of an aircraft canopy 94, that may be utilized, tested, and/or characterized with methods 100, 200, and/or 300, according to the present disclosure. Examples of aircraft 78 include a commercial aircraft, a military aircraft, a fighter jet, and/or a spacecraft.

Structural assembly 80 may include a frame 82 that defines a channel 84. Structural assembly 80 also may include a transparency 86 that may be bonded to frame 82 within channel 84 and/or utilizing a structure adhesive 88. A region where frame 82 and transparency 86 come together and/or or are adhered to one another via structure adhesive 88 may be referred to herein as a bondline 90. Structural assembly 80 may define an interior region 96, such as may be internal to and/or may face toward aircraft 78, and an exterior region 98, such as may be external to and/or may face away from aircraft 78. A surface 92, which also may be referred to herein as an external surface 92, may bound structural assembly 80, including interior region 96 and/or exterior region 98 thereof.

As discussed, it may be desirable to test structural assembly 80, such as to certify performance of the structural assembly under operating conditions of the aircraft. As also discussed, it may be difficult, or even impossible, to utilize non-destructive testing to inspect bondline 90, or at least an entirety of bondline 90, such as may be due to the fact that bondline 90 is at least partially positioned within channel 84 of frame 82. In addition, non-destructive testing may be incapable of detecting all physical changes to, or potential degradation modes of, structural assembly 80 and/or bondline 90 thereof. Thus, proof testing may be utilized. This proof testing may involve establishing a pressure differential between interior region 96 and exterior region 98, such as to ensure that structural assembly 80 withstands pressure differentials equal to, or even greater than, those experienced under the operating conditions of the aircraft. However, the relatively high pressure differentials utilized, and the correspondingly high forces exerted on structural assembly 80 may cause undesired secondary effects, such as damage to other components of aircraft 78, under conditions in which the structural integrity of structural assembly 80 is insufficient to withstand proof testing conditions.

With the above in mind, systems 10 and/or methods 100, 200, and/or 300 may be utilized to verify the structural integrity of the structural assembly and/or to proof test the structural assembly. As discussed in more detail herein, systems 10 and/or methods 100, 200, and/or 300 may be utilized to predict that the structural integrity of structural assembly 80 is insufficient to withstand the operating conditions of the aircraft and/or to certify performance of structural assembly 80 under the operating conditions of aircraft 78 without subjecting structural assembly 80 to conventional proof testing conditions and/or without subjecting structural assembly 80 to conditions in which the structural integrity of structural assembly 80 is insufficient to withstand the testing conditions.

Figure 2:
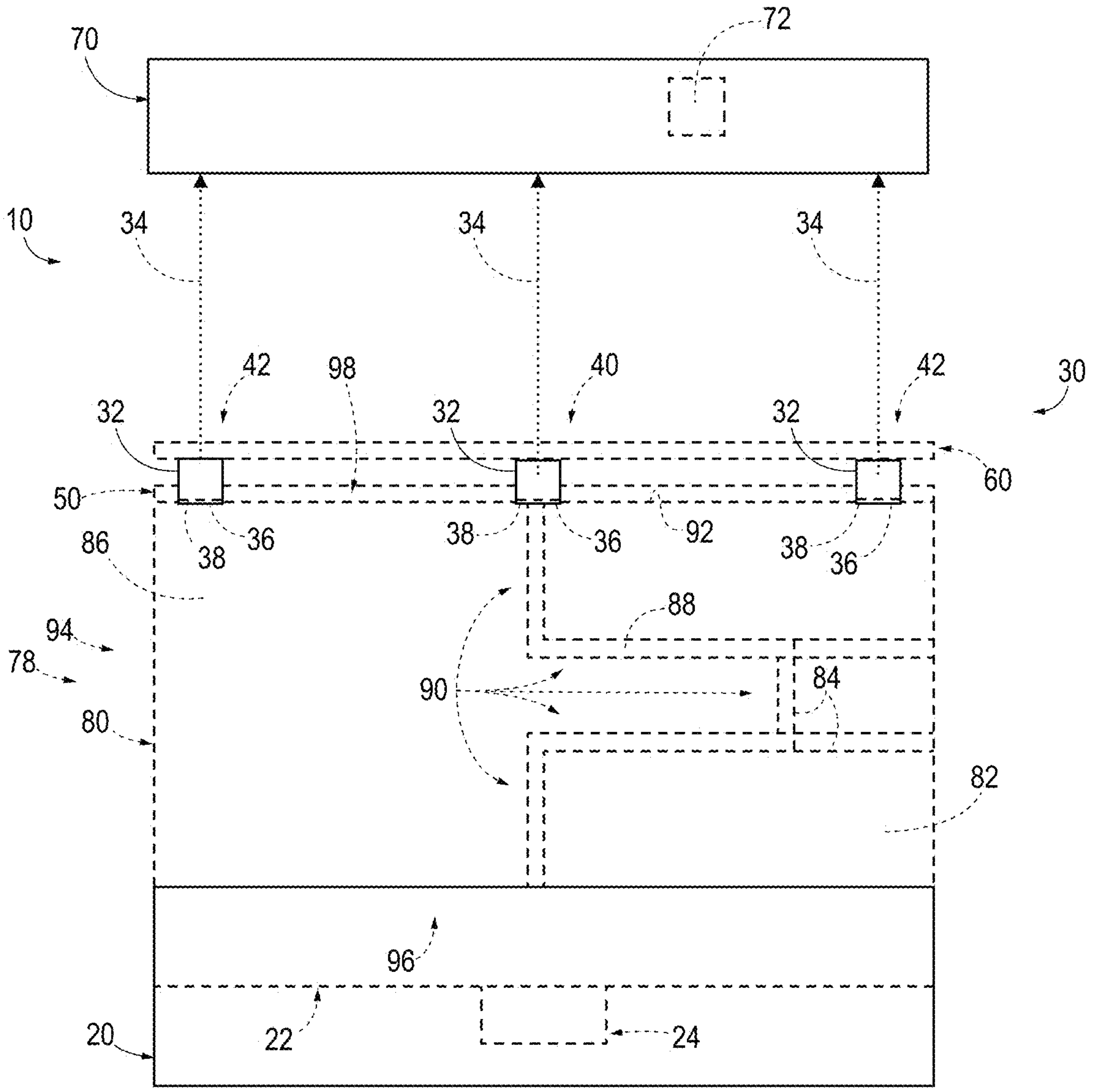
FIG. 2 is a schematic illustration of examples of an acoustic evaluation system according to the present disclosure.
Figure 3:
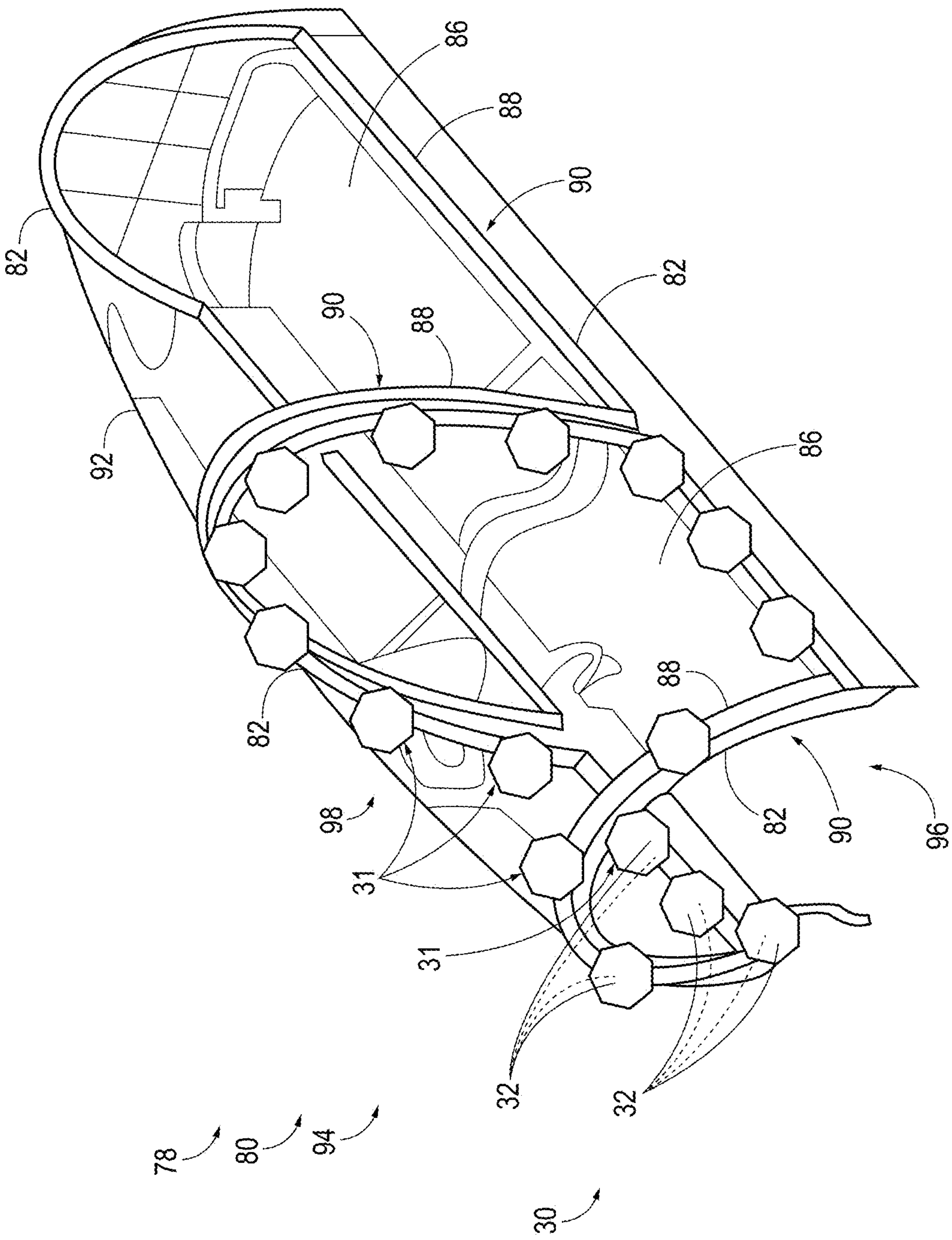
FIG. 3 is a less schematic illustration of an example of a structural assembly, in the form of an aircraft canopy, that includes a plurality of acoustic sensors and may be utilized with systems and/or methods, according to the present disclosure.
Figure 4:
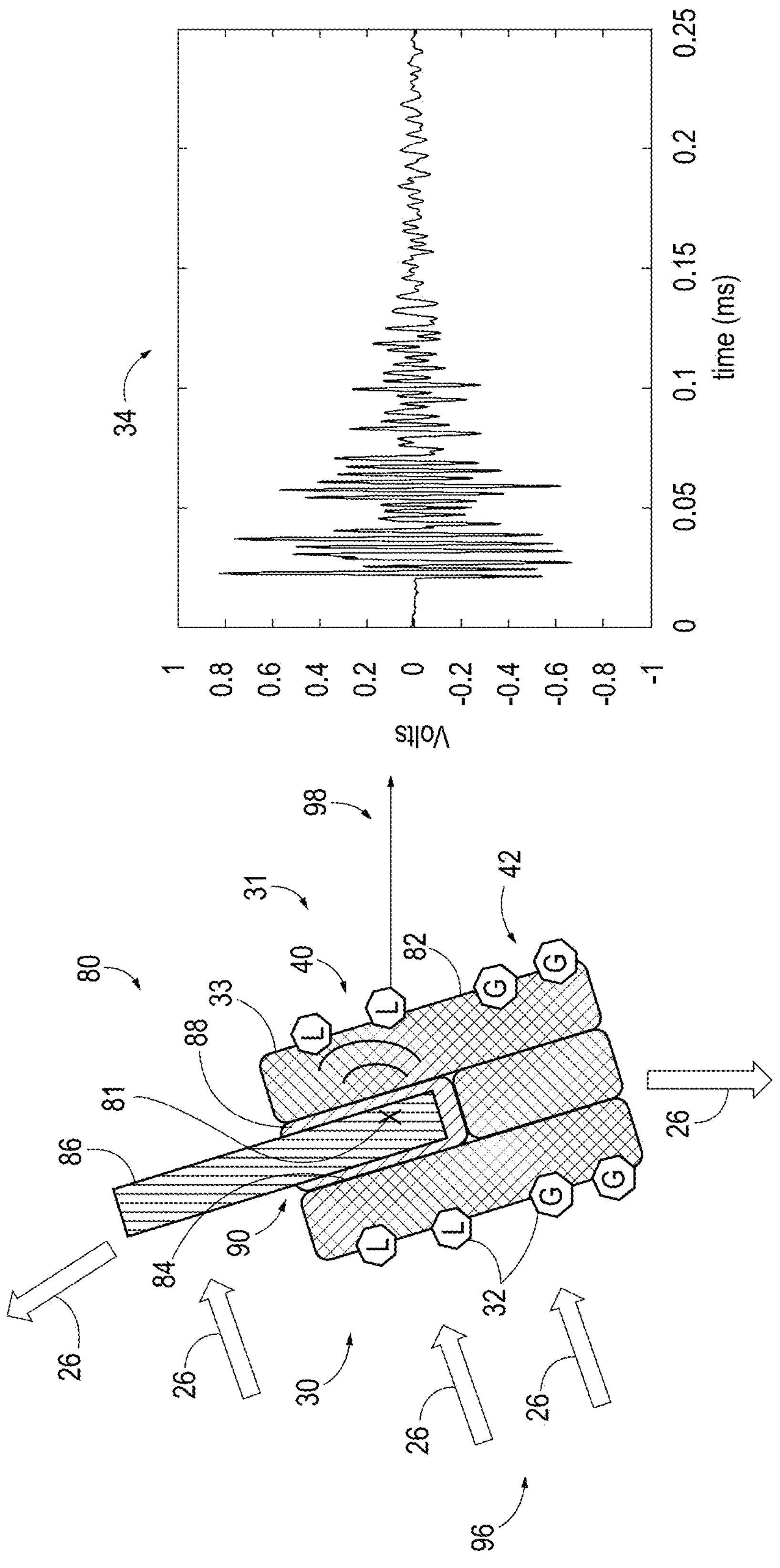
FIG. 4 is a schematic cross-sectional view illustrating an example of a structural assembly that may generate acoustic emission data that may be utilized with systems and/or methods, according to the present disclosure.

FIG. 2 is a schematic illustration of examples of an acoustic evaluation system 10 according to the present disclosure. FIG. 3 is a less schematic illustration of an example of a structural assembly 80, in the form of an aircraft canopy 94, that includes a plurality of acoustic sensors 32 and may be utilized with and/or form a portion of systems 10 and/or methods 100, 200, and/or 300, according to the present disclosure. FIGS. 4-10 are schematic cross-sectional views illustrating examples of structural assemblies 80 that may generate acoustic emission data 34, as illustrated in FIGS. 2 and 4, that may be utilized with systems 10 and/or methods 100, 200, and/or 300, according to the present disclosure.

Acoustic evaluation systems 10 may be configured to acoustically evaluate structural assemblies 80 that include bondlines 90. As illustrated in FIG. 2, acoustic evaluation systems 10 include a validation structure 20, an acoustic sensing system 30, and an analyzer module 70. Validation structure 20 may be configured to apply a validation condition to structural assembly 80. Examples of the evaluation condition are discussed in more detail herein. Acoustic sensing system 30 includes a plurality of acoustic sensors 32, which may be configured to be positioned in acoustic communication with structural assembly 80 and/or to generate acoustic emission data 34. Acoustic emission data 34 may be indicative of, based upon, and/or generated responsive to acoustic emissions from structural assembly 80. The acoustic emissions may be produced and/or generated during validation of structural assembly 80 via the validation condition. Stated differently, application of the validation condition to structural assembly 80 by validation structure 20 may cause structural assembly 80 to produce and/or generate acoustic emissions, which may be detected by acoustic sensors 32 and output therefrom as acoustic emission data 34.

As an example, and with reference to FIG. 4, the validation condition may include application of a deformation force 26 to structural assembly 80. Deformation force 26 may be generated in any suitable manner, including those that are discussed herein. In the example of FIG. 4, deformation force 26 may be generated via a pressure differential between interior region 96 and exterior region 98 of structural assembly 80. As also illustrated in FIG. 4, and responsive to the validation condition, structural assembly 80 may experience and/or exhibit a physical change 81. Physical change 81 may be accompanied by acoustic emissions 33, which may be detected by acoustic sensors 32. Acoustic sensors 32 then may produce and/or generate acoustic emission data 34, which is indicative of acoustic emissions 33.

Physical change 81 may include and/or be any suitable change, or physical change, to bondline 90, such as may be produced and/or generated responsive to the validation condition. Examples of physical change 81 include deformation of the bondline, damage initiation within the bondline, and/or damage growth within the bondline. Another example of physical change 81 includes degradation of the bondline. Examples of the degradation of the bondline include a weak bond within the bondline, disbonding of the bondline, a kissing bond within the bondline (e.g., a partial bond within the bondline and/or proximate but unbonded components in the bondline), at least one void within the bondline, and/or an undesired bondline condition within the bondline.

Analyzer module 70 may be adapted, configured, and/or programmed to receive acoustic emission data 34 and to filter the acoustic emission data to generate filtered acoustic emission data. The filtered acoustic emission data includes a bondline-proximate subset of the acoustic emission data, which was generated relatively proximate, or within, bondline 90. The filtered acoustic emission data excludes a bondline-distal subset of the acoustic emission data, which was generated relatively distal, or external, bondline 90.

Validation structure 20 may include any suitable structure that may be adapted, configured, designed, and/or constructed to apply the validation condition to structural assembly 80. Examples of validation structure 20 include a mechanical validation structure configured to generate the validation condition in the form of a mechanical deformation force, a pneumatic validation structure configured to generate the validation condition in the form of a pneumatic deformation force, a hydraulic validation structure configured to generate the validation condition in the form of a hydraulic deformation force, a pressure validation structure configured to generate the validation condition in the form of a pressure deformation force, and/or an energy application structure configured to generate the validation condition in the form of energy transmission through the structural assembly. Stated differently, the validation condition may include any suitable environmental, geometric, and/or structural condition that may be applied to structural assembly 80 and/or that may cause structural assembly 80 to produce, to generate, and/or to emit the acoustic emissions. Stated still differently, the validation condition may include any suitable force and/or energy that may be applied to structural assembly 80 and/or that may cause structural assembly 80 to produce, to generate, and/or to emit the acoustic emissions. Additional examples of the validation condition include solid wave propagation within structural assembly 80, energy transmission through structural assembly 80, mechanical energy transmission through structural assembly 80, thermal energy transmission through structural assembly 80, and/or electrical energy transmission through structural assembly 80.

In a specific example, and as discussed, structural assembly 80 may include and/or be an aircraft canopy 94. In such examples, validation structure 20 may include an isolation structure 22 configured to fluidically isolate interior region 96 of aircraft canopy 94 from exterior region 98 of aircraft canopy 94. Additionally or alternatively, validation structure 20 may include a pressure differential generation structure 24 configured to generate a pressure differential between interior region 96 and exterior region 98. In such examples, the validation condition may include and/or be the pressure differential.

Acoustic sensing system 30 may include any suitable structure that includes the plurality of acoustic sensors 32. Examples of acoustic sensors 32 include a vibration detector, a wave detector, a sound detector, a microphone, a piezoelectric transducer, an ultrasonic sensor, and acoustic emission sensor, an accelerometer, a motion sensor, a surface acoustic wave sensor, a bulk acoustic wave sensor, a thickness shear mode resonator, and/or a flexural plate wave sensor.

In some examples, acoustic sensors 32 may be configured to be operatively attached and/or adhered to structural assembly 80. As an example, acoustic sensing system 30 may include an adhesive material 36 that adheres acoustic sensors 32 to structural assembly 80. As another example, acoustic sensing system 30 may include an acoustic transfer material 38 that operatively attaches acoustic sensors 32 to structural assembly 80 and/or that extends between acoustic sensors 32 and structural assembly 80. Examples of acoustic transfer material 38 include a grease, an oil, petroleum jelly, and/or mineral oil.

As collectively illustrated by FIGS. 2-10, acoustic sensors 32 may be spaced-apart from one another on structural assembly 80. Additionally or alternatively, acoustic sensors 32 may be supported on and/or by a surface 92 of structural assembly 80. Such a configuration may facilitate attachment of acoustic sensors 32 to structural assembly 80 and/or separation of acoustic sensors 32 from structural assembly 80.

In some examples, acoustic sensors 32 may include a bondline-proximate subset 40 and a bondline-distal subset 42, as illustrated in FIG. 2. Bondline-proximate subset 40 may be proximate bondline 90 and/or may be relatively proximate bondline 90 with respect to, or when compared to, bondline-distal subset 42. Additionally or alternatively, bondline-distal subset 42 may be relatively distal bondline 90 with respect to, or when compared to, bondline-proximate subset 40.

In such a configuration, the bondline-proximate subset of acoustic emission data 34 may include acoustic emission data that is detected by bondline-proximate subset 40, that is initially detected by bondline-proximate subset 40, and/or that is detected by bondline-proximate subset 40 prior to being detected by bondline-distal subset 42. Additionally or alternatively, the bondline-distal subset of acoustic emission data 34 may include acoustic emission data that is detected by bondline-distal subset 42, that is initially detected by bondline-distal subset 42, and/or that is detected by bondline-distal subset 42 prior to being detected by bondline-proximate subset 40. Stated differently, a spatial relationship among acoustic sensors 32 and/or between bondline-proximate subset 40 and bondline-distal subset 42 may permit and/or facilitate determination and/or differentiation of a location, within structural assembly 80, that produces, generates, and/or emits the acoustic emissions and/or of a direction from which the acoustic emissions emitted. This determination and/or differentiation may permit and/or facilitate generation of the filtered acoustic emission data by analyzer module 70, as is discussed in more detail herein.

In some examples, and as illustrated in dashed lines in FIG. 2, acoustic evaluation system 10 may include a template 50. Template 50 may be adapted, configured, sized, shaped, and/or constructed to permit and/or facilitate rapid, accurate, and/or precise positioning of acoustic sensors 32 at a corresponding plurality of spaced-apart sensing locations on and/or relative to structural assembly 80. Such a configuration may permit and/or facilitate operative use of acoustic evaluation systems 10 in a production environment and/or to sequentially evaluate a plurality of separate, distinct, and/or different structural assemblies 80.

As also illustrated in dashed lines in FIG. 2, acoustic evaluation systems 10 may include a sensor support structure 60. Sensor support structure 60 may be configured to retain acoustic sensors 32 in acoustic contact with, in physical contact with, and/or in direct physical contact with structural assembly 80 and may be separate and/or distinct from structural assembly 80. Such a configuration may permit and/or facilitate rapid attachment of acoustic sensors 32 to and/or separation of acoustic sensors 32 from structural assembly 80, such as may be beneficial in the production environment and/or when acoustic evaluation system 10 is utilized to sequentially evaluate the plurality of separate, distinct, and/or different structural assemblies 80.

Acoustic sensors 32 may be positioned on structural assembly 80 in any suitable orientation, or relative orientation, such as may be utilized to permit and/or facilitate generation of the filtered acoustic emission data, as discussed in more detail herein. As an example, and as discussed herein with reference to FIG. 2-6, bondline-proximate subset 40 may be positioned relatively proximate bondline 90, while bondline-distal subset 42 may be positioned relatively distal bondline 90. As another example, and as illustrated in FIG. 3, one or more acoustic sensors 32 may be positioned along bondline 90 and/or at a plurality of different and/or distinct sensor regions 31 along bondline 90.

As illustrated in FIGS. 4-10, and in some examples, a plurality of acoustic sensors 32 may be positioned at each sensor region 31, with a configuration and/or relative orientation for the plurality of acoustic sensors 32 being selected and/or specified to permit and/or facilitate generation of the filtered acoustic emission data. As also illustrated in FIGS. 4-10, these acoustic sensors 32 may be separated into, segregated into, and/or classified as local acoustic sensors, which are designated with an "L" in FIGS. 4-10, and gating acoustic sensors, which are designated with a "G" in FIGS. 4-10. Local acoustic sensors L may be positioned relatively proximate and/or on regions of structural assembly 80 from which detected acoustic emissions will be included in the filtered acoustic emission data. In contrast, gating acoustic sensors G may be positioned relatively distal and/or surrounding such regions of structural assembly 80 and/or may be positioned relatively proximate and/or on regions of structural assembly 80 from which detected acoustic emissions will be excluded from the filtered acoustic emission data. Stated differently, local acoustic sensors L may be utilized to detect acoustic emissions of interest and/or acoustic emissions that originate relatively proximate bondline 90. In contrast, gating acoustic sensors G may be utilized to detect background acoustic emissions, to detect acoustic emissions that are not of interest, and/or to detect acoustic emissions that originate from regions of structural assembly 80 other than bondline 90. As such, analysis, by analyzer module 70, of acoustic emissions detected by local acoustic sensors L vs. gating acoustic sensors G and/or of the timing of detection of a given acoustic emission by local acoustic sensors L vs. gating acoustic sensors G may permit and/or facilitate separation and/or classification of the acoustic emissions into the bondline-proximate subset of the acoustic emission data and the bondline-distal subset of the acoustic emission data.

Figure 5:
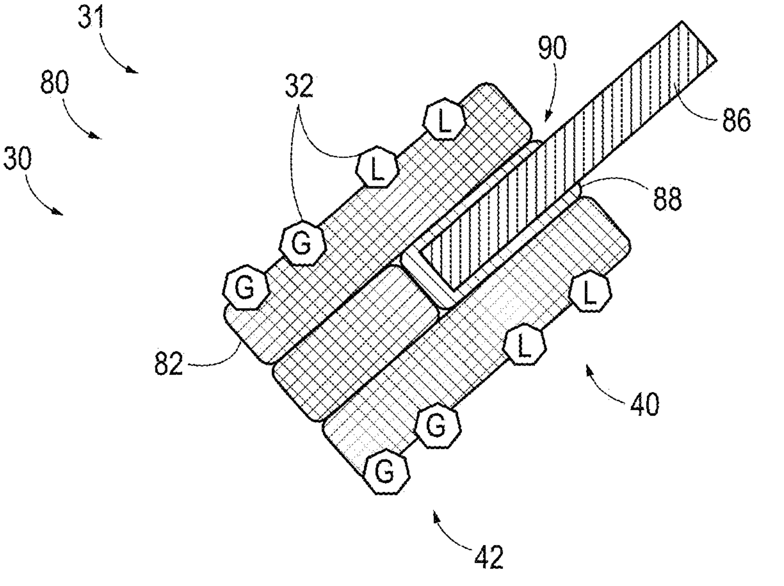
FIG. 5 is another schematic cross-sectional view illustrating an example of a structural assembly that may be utilized with systems and/or methods, according to the present disclosure.

Local acoustic sensors L and gating acoustic sensors G may have any suitable relative orientation. As an example, and as illustrated in FIGS. 4-5, local acoustic sensors L may be positioned relatively proximate bondline 90, while gating acoustic sensors G may be positioned relatively distal bondline 90. As another example, and as illustrated in FIGS. 6-10, local acoustic sensors L may be positioned within a region of interest within bondline 90, while gating acoustic sensors G may be positioned to surround the region of interest. This may include positioning gating acoustic sensors G relatively proximate bondline 90, relatively distal bondline 90, and/or relatively distal the region of interest within bondline 90 relative to local acoustic sensors L. In such configurations, the bondline-proximate subset of the acoustic emission data also may be referred to herein as local acoustic emission data, and the bondline-distal subset of the acoustic emission data also may be referred to herein as gating acoustic emission data. In such examples, the local acoustic emission data may include acoustic emission data generated within the region of interest and may be included in the filtered acoustic emission data, while the gating acoustic emission data may include acoustic emission data generated external the region of interest and may be excluded from the filtered acoustic emission data.

Figure 6:
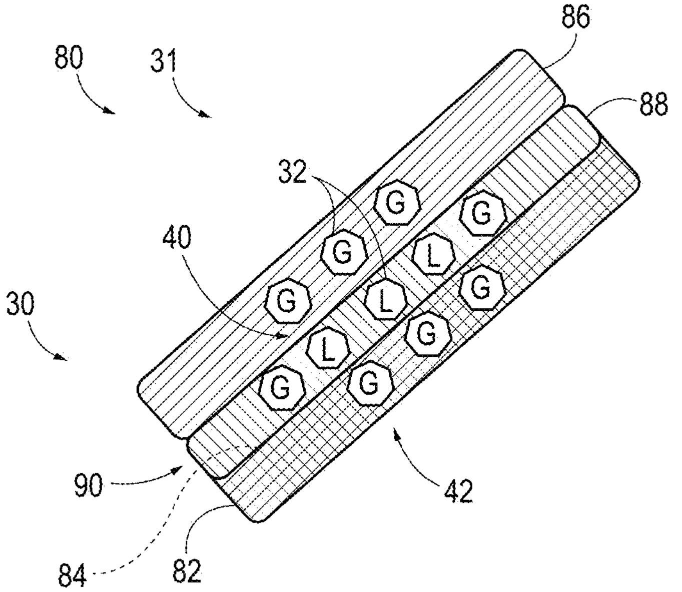
FIG. 6 is another schematic cross-sectional view illustrating an example of a structural assembly that may be utilized with systems and/or methods, according to the present disclosure.
Figure 7:
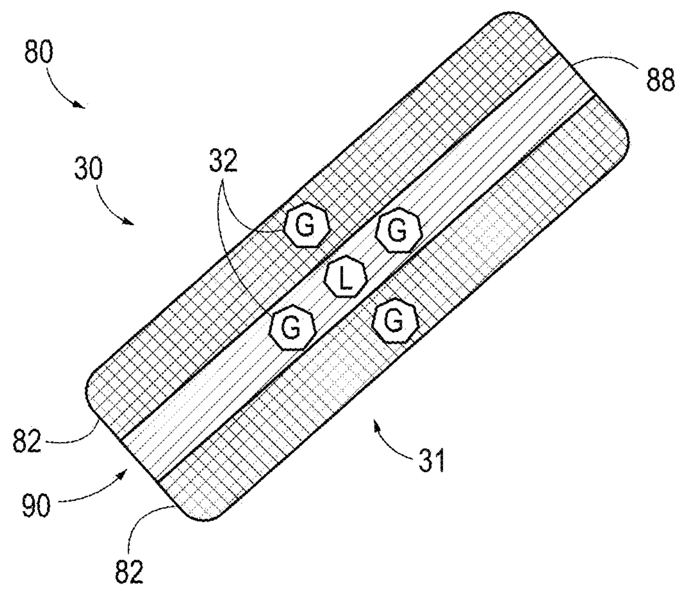
FIG. 7 is another schematic cross-sectional view illustrating an example of a structural assembly that may be utilized with systems and/or methods, according to the present disclosure.
Figure 8:
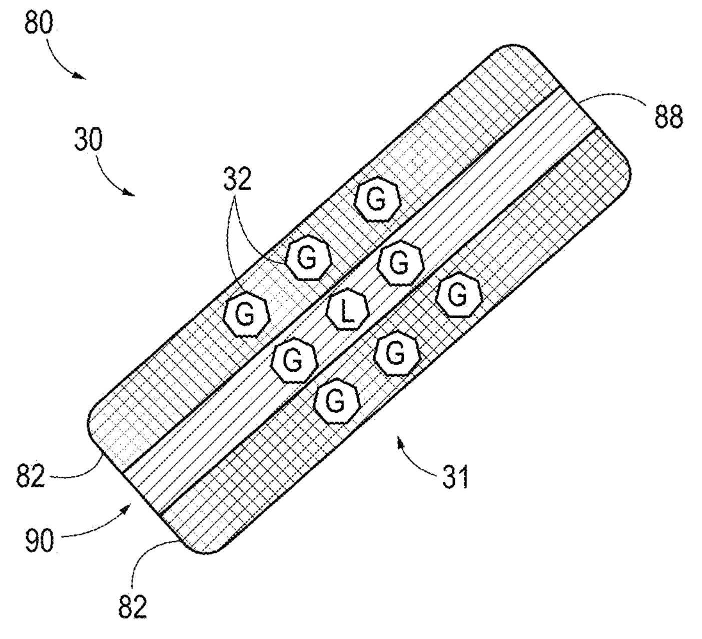
FIG. 8 is another schematic cross-sectional view illustrating an example of a structural assembly that may be utilized with systems and/or methods, according to the present disclosure.
Figure 9:
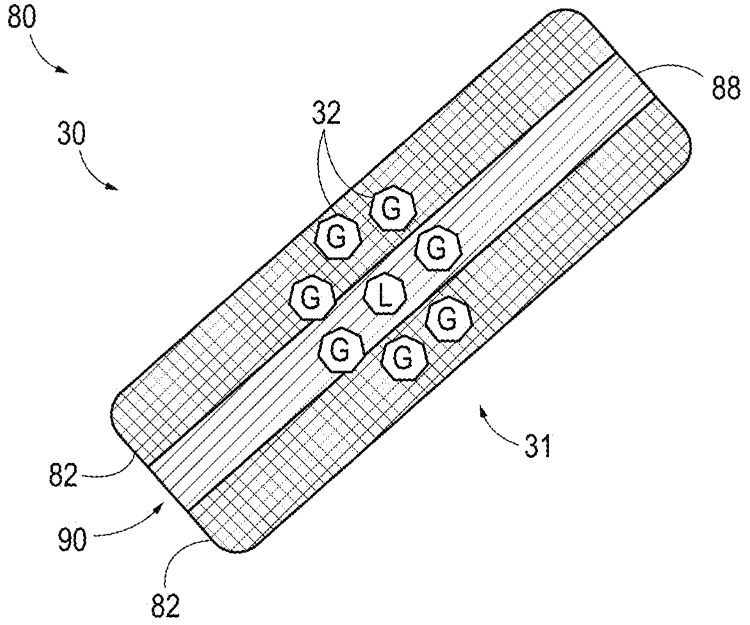
FIG. 9 is another schematic cross-sectional view illustrating an example of a structural assembly that may be utilized with systems and/or methods, according to the present disclosure.
Figure 10:
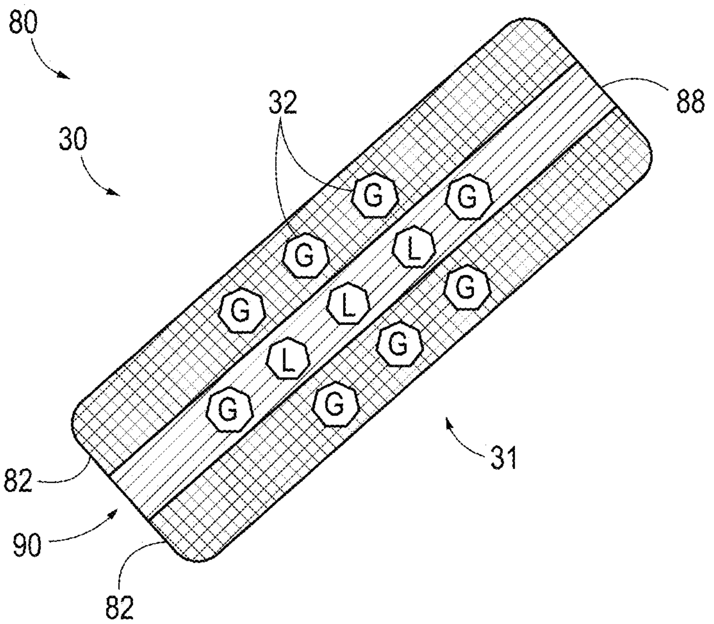
FIG. 10 is another schematic cross-sectional view illustrating an example of a structural assembly that may be utilized with systems and/or methods, according to the present disclosure.

It is within the scope of the present disclosure that structural assembly 80 may define bondline 90 in any suitable manner. As an example, and as illustrated in FIGS. 2-5, bondline 90 may be at least partially positioned and/or defined within channel 84 of frame 82 that receives transparency 86, with transparency 86 and frame 82 being adhered to one another via structure adhesive 88. As another example, and as illustrated in FIGS. 2 and 6, bondline 90 may be defined between overlapping regions of frame 82 and transparency 86 that are adhered to one another via structure adhesive 88, with these overlapping regions of frame 82 being referred to herein as defining channel 84. As another example, and as illustrated in FIGS. 7-10, bondline 90 may be defined between overlapping regions of frame 82 that are adhered to one another via structure adhesive 88.

In some examples, acoustic evaluation system 10 may include structural assembly 80. Stated differently, and in such examples, structural assembly 80 may form a portion of acoustic evaluation system 10. Structural assembly 80 may include and/or be any suitable structure that may include bondline 90, that may experience the validation condition, that may be in acoustic communication with acoustic sensing system 30, and/or that may generate acoustic emissions responsive to and/or during validation via the validation condition. Examples of structural assembly 80 include a laboratory coupon, a sub-assembly, an assembled commercial component configured to be included within a commercial assembly, and/or aircraft canopy 94 configured to be included in aircraft 78.

In some examples, and as discussed, structural assembly 80 may include frame 82, transparency 86, and structure adhesive 88, which may adhere transparency 86 to frame 82 to define bondline 90. In some such examples, and as also discussed, frame 82 may define channel 84. In such a configuration, at least a region of transparency 86 may be received within channel 84 and/or structure adhesive 88 may adhere transparency 86 to frame 82 within channel 84. As illustrated in FIG. 2, channel 84 may at least partially surround the region of transparency 86, such as on at least one, at least two, or at least three sides. Such a configuration may preclude operative use, or reliable operative use, of visual inspection and/or of non-destructive testing methodologies, such as ultrasonic inspection, to evaluate bondline 90, as discussed.

It is within the scope of the present disclosure that structural assembly 80 may be formed and/or defined by a plurality of different and/or distinct materials. In such configurations, structural assembly 80 also may be referred to herein as and/or may be a composite assembly 80 and/or a composite structural assembly 80. In a specific example frame 82 may be defined by a frame material, and transparency 86 may be defined by a transparency material that differs from the frame material. Additionally or alternatively, structure adhesive 88 may be defined by a structure adhesive material that differs from the frame material and/or from the transparency material. Examples of the frame material include a metal, a metal alloy, and/or a metallic frame material. Examples of the transparency material include a polymeric transparency material, an acrylic transparency material, and/or a polycarbonate transparency material. Examples of the structure adhesive material include a polymeric structure adhesive material and/or an epoxy structure adhesive material.

With the above in mind, bondline 90 may be, or may be referred to herein as, an interface region between two dissimilar materials, such as the frame material, the transparency material, and/or the adhesive material. Additionally or alternatively, bondline 90 may be, or may be referred to herein as, an adhesion region between the two dissimilar materials.

Analyzer module 70 may include any suitable structure that may be adapted, configured, designed, constructed, trained, and/or programmed to receive acoustic emission data 34 and/or to filter acoustic emission data 34 to generate the filtered acoustic emission data. Additionally or alternatively, analyzer module 70 may include any suitable structure that may be adapted, configured, designed, constructed, trained, and/or programmed to perform any suitable step and/or steps of methods 100, 200, and/or 300, which are discussed in more detail herein.

As examples, analyzer module 70 may include one or more of an electronic controller, a dedicated controller, a special-purpose controller, a personal computer, a special-purpose computer, a display device, a logic device, a memory device, and/or a memory device having computer-readable storage media 72. Computer-readable storage media 72, when present, also may be referred to herein as and/or may be non-transitory computer readable storage media. This non-transitory computer readable storage media may include, define, house, and/or store computer-executable instructions, programs, and/or code; and these computer-executable instructions may direct acoustic evaluation system 10 and/or analyzer module 70 thereof to perform any suitable portion, or subset, of methods 100, 200, and/or 300. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

It is within the scope of the present disclosure that acoustic evaluation systems 10 and/or analyzer module 70 thereof may utilize and/or perform one or more aspects of a machine learning model. As an example, and as discussed in more detail herein, acoustic evaluation systems 10 and/or analyzer module 70 thereof may perform one or more steps of methods 100. In some such examples, a classification dataset that is produced and/or generated via methods 100 also may be referred to herein as and/or may be training data for the machine learning model and/or for a supervised learning model. As another example, and as also discussed in more detail herein, acoustic evaluation systems 10 and/or analyzer module 70 thereof may perform one or more steps of methods 200 and/or 300. In some such examples, the machine learning model and/or the supervised learning model may be trained on and/or utilizing the classification dataset, such as may be generated utilizing methods 100. Stated differently, it is within the scope of the present disclosure that methods 100, 200, and/or 300 may be one or more aspects of the machine learning model, such as is discussed.

Figure 11:
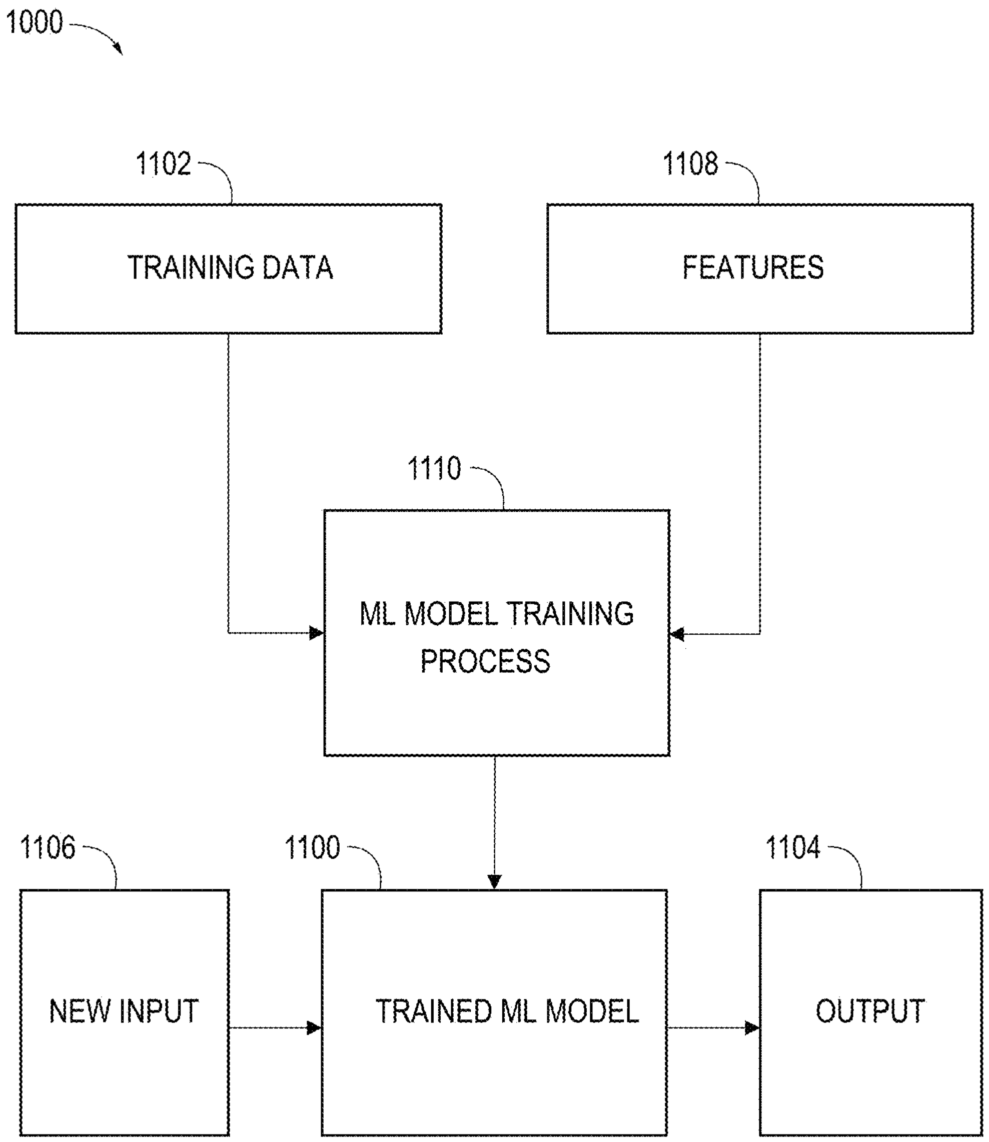
FIG. 11 is a flowchart illustrating training and/or utilization of an illustrative machine learning model, according to the present disclosure.

With the above in mind, FIG. 11 is a flowchart illustrating training and/or utilization of an illustrative machine learning model 1000, according to the present disclosure. Machine learning models may be utilized in one or more conversion aspects of acoustic evaluation systems 10 and/or of methods 100, 200, and/or 300.

In general, machine learning (ML) models (also referred to as ML algorithms, ML tools, or ML programs) may be utilized to generate predictions, classifications, characterizations, evaluations, and/or decisions that are useful in themselves and/or in the service of a more comprehensive program. ML models “learn” by example, based on existing sample data, and generate a trained model. Using the trained model, predictions or decisions can then be made regarding new data without explicit programming. Machine learning therefore involves algorithms or tools that learn from existing data and make predictions or inferences about novel data.

Training data 1102 (e.g., labeled training data) is utilized to build a trained ML model 1100, such that the ML model can produce a desired output 1104 when presented with new data 1106. In general, the ML model uses labeled training data 1102, which includes values for the input variables and values for the known correct outputs, to ascertain relationships and correlations between variables or features 1108 to produce an algorithm mapping the input values to the outputs.

Supervised learning methods may be utilized for the purposes of producing classification or regression algorithms. Classification algorithms are typically used in situations where the goal is categorization (e.g., whether a photo contains a cat or a dog). Regression algorithms are typically used in situations where the goal is a numerical value (e.g., the market value of a house).

Features 1108 may include any suitable characteristics capable of being measured and configured to provide some level of information regarding the input scenario, situation, or phenomenon. For example, if the goal is to provide an output relating to the market value of a house, then the features may include variables such as square footage, postal code, year built, lot size, number of bedrooms, etc. Although these example features are numeric, other feature types may be included, such as strings, Boolean values, etc.

Different ML techniques may be used, depending on the application. For example, artificial neural networks, decision trees, support-vector machines, regression analysis, Bayesian networks, genetic algorithms, random forests, and/or the like may be utilized to produce the trained ML model.

Trained ML model 1100 is produced by training process 1110 based on identified features 1108 and training data 1102. Trained ML model 1100 can then be utilized to predict a category or infer an output value 1104 based on new data 1106.

Figure 12:
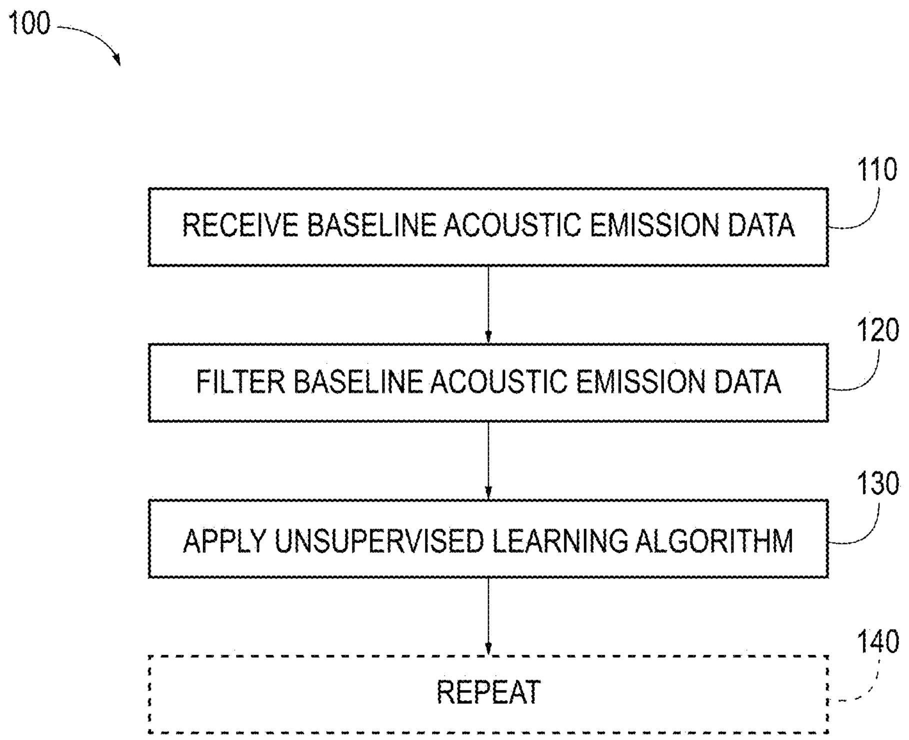
FIG. 12 is a flowchart depicting examples of methods of characterizing bondline integrity of structural assemblies, according to the present disclosure.

FIG. 12 is a flowchart depicting examples of methods 100 of characterizing bondline integrity of structural assemblies, according to the present disclosure. Examples of the structural assemblies are disclosed herein with reference to structural assemblies 80. Methods 100 may be performed with, via, and/or utilizing any suitable component and/or components of acoustic evaluation systems 10, which are disclosed herein.

Methods 100 include receiving baseline acoustic emission data at 110 and filtering the baseline acoustic emission data at 120. Methods 100 also include applying an unsupervised learning model at 130 and may include repeating at 140. The repeating at 140 may include repeating the receiving at 110, the filtering at 120, and/or the applying at 130 for each baseline structural assembly of a plurality of baseline structural assemblies. Examples of the baseline structural assembly are disclosed herein with reference to structural assembly 80.

Receiving baseline acoustic emission data at 110 may include receiving baseline acoustic emission data generated during validation of each baseline structural assembly. Each baseline structural assembly includes a corresponding baseline bondline, and at least a subset of the baseline acoustic emission data is generated during a physical change to the corresponding baseline bondline. An example of the baseline acoustic emission data generated by a given baseline bondline is illustrated in FIG. 4 and indicated at 34. Examples of the physical change are disclosed herein with reference to physical change 81.

The receiving at 110 may be performed in any suitable manner. As an example, the receiving at 110 may include receiving the baseline acoustic emission data from a database of acoustic emission data. Stated differently, the baseline acoustic emission data may be preestablished prior to performing methods 100.

As another example, the receiving at 110 may include generating the baseline acoustic emission data, such as may be performed during and/or as a part of methods 100. The generating may be performed in any suitable manner. As an example, the generating the baseline acoustic emission data may include applying a validation condition to each baseline structural assembly. Examples of the validation condition are disclosed herein.

Filtering the baseline acoustic emission data at 120 may include filtering the baseline acoustic emission data to generate filtered baseline acoustic emission data. The filtered baseline acoustic emission data includes a baseline bondline-proximate subset of the baseline acoustic emission data, which is generated relatively proximate and/or within the corresponding baseline bondline. The filtered baseline acoustic emission data excludes a baseline bondline-distal subset of the baseline acoustic emission data that is generated relatively distal and/or external the corresponding baseline bondline.

The filtering at 120 may be performed in any suitable manner. As an example, the filtering at 120 may include utilizing wave mechanics calculations to determine a plurality of emission locations, source directions, and/or origin directions, within each baseline structural assembly and for the baseline acoustic emission data. In such examples, the baseline bondline-proximate subset of the baseline acoustic emission data includes baseline acoustic emission data with bondline-proximate emission locations that are relatively proximate, or within, the corresponding baseline bondline. Also in such examples, the baseline bondline-distal subset of the baseline acoustic emission data includes baseline acoustic emission data with bondline-distal emission locations that are relatively distal, or external, the corresponding baseline bondline.

As another example, and as discussed in more detail herein with reference to acoustic evaluation systems 10, the baseline acoustic emission data may be produced and/or generated by a plurality of acoustic sensors in acoustic communication with each baseline structural assembly. In such examples, the receiving at 110 may include generating the baseline acoustic emission data utilizing the plurality of acoustic sensors. In such a configuration, the acoustic sensors also may be referred to herein as and/or may be baseline acoustic sensors. As also discussed in more detail herein, the plurality of acoustic sensors may include a baseline bondline-proximate subset of the plurality of acoustic sensors that is relatively proximate the baseline bondline and a baseline bondline-distal subset of the plurality of acoustic sensors that is relatively distal the baseline bondline. In such a configuration, the baseline bondline-proximate subset of the baseline acoustic emission data may include baseline acoustic emission data initially detected by the baseline bondline-proximate subset of the plurality of acoustic sensors. Similarly, the baseline bondline-distal subset of the baseline acoustic emission data may include baseline acoustic emission data initially detected by the baseline bondline-distal subset of the plurality of acoustic sensors.

Applying the unsupervised learning model at 130 may include applying the unsupervised learning model to the filtered baseline acoustic emission data to generate a classification dataset. The classification dataset identifies at least one characteristic of the filtered baseline acoustic emission data that is indicative of a physical change to the corresponding baseline bondline during validation of each baseline structural assembly. The applying at 130 may be performed in any suitable manner. As an example, the applying at 130 may include determining a frequency of the filtered baseline acoustic emission data that is indicative of the physical change to the corresponding baseline bondline. As another example, the applying at 130 may include determining an amplitude of the filtered baseline acoustic emission data that is indicative of the physical change to the corresponding baseline bondline. As another example, the applying at 130 may include determining a wavelength of the filtered baseline acoustic emission data that is indicative of the physical change to the corresponding baseline bondline. As another example, the applying at 130 may include determining an energy of the filtered baseline acoustic emission data that is indicative of the physical change to the corresponding baseline bondline. As another example, the applying at 130 may include determining a cumulative energy of the filtered baseline acoustic emission data that is indicative of the physical change to the corresponding baseline bondline. As another example, the applying at 130 may include determining an energy per hit of the filtered baseline acoustic emission data that is indicative of the physical change to the corresponding baseline bondline.

Figure 13:
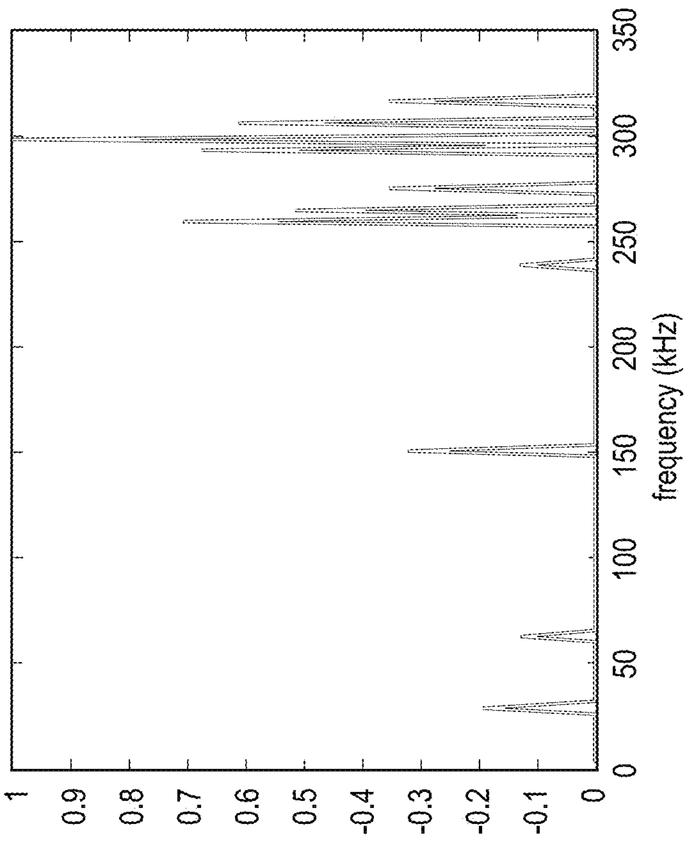
FIG. 13 illustrates an example of baseline acoustic emission data according to the present disclosure.

In some examples, the applying at 130 may include determining a frequency distribution, or a frequency distribution function, of the filtered baseline acoustic emission data. Examples of the frequency distribution function include a Fourier transform of the filtered baseline acoustic emission data and a fast Fourier transform of the filtered baseline acoustic emission data. A more specific example of the frequency distribution function of acoustic emission data 34 of FIG. 4 is illustrated in FIG. 13.

Figure 15:
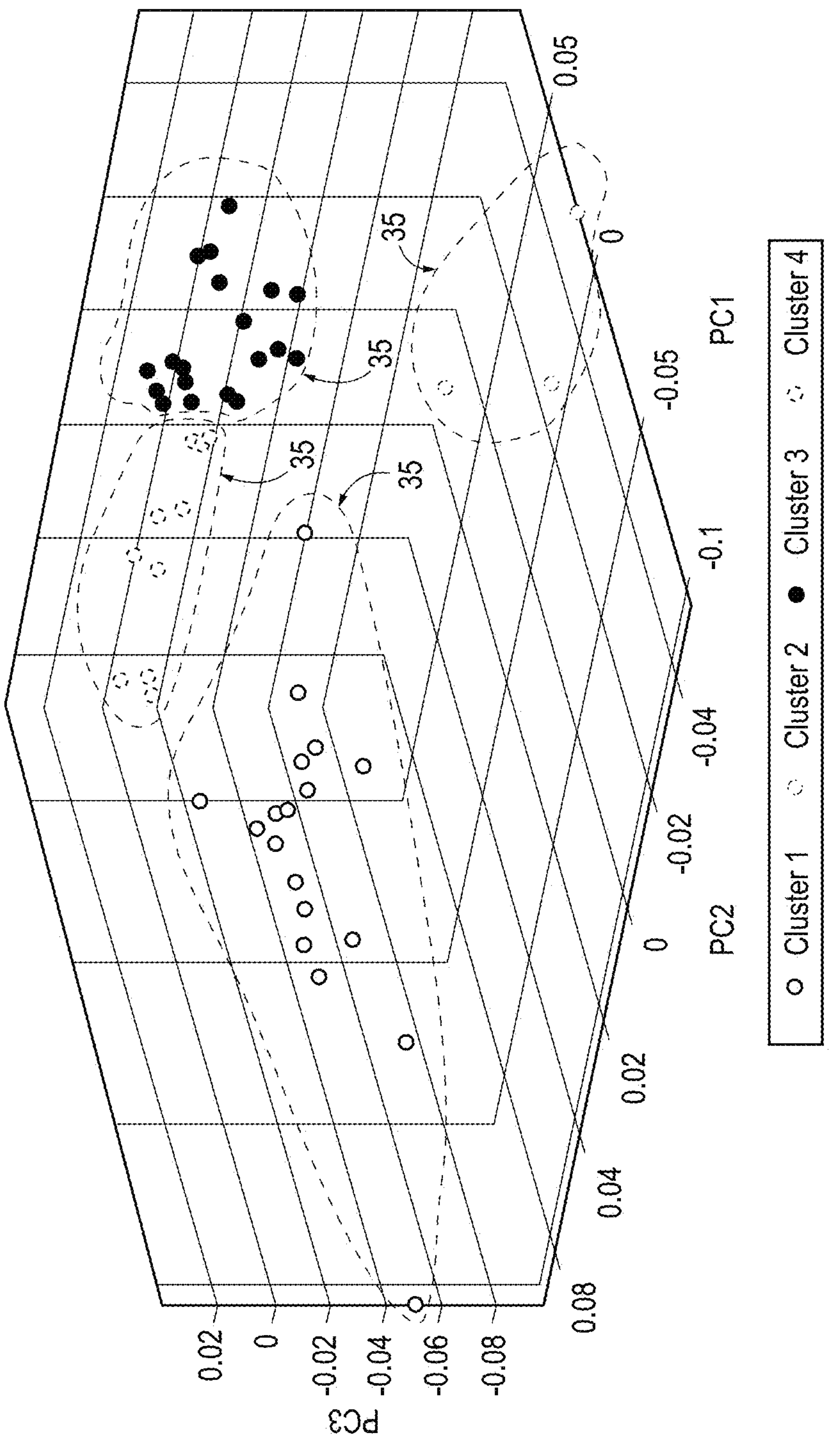
FIG. 15 illustrates an alternative representation of the classification dataset of FIG. 14.

In some examples, the applying at 130 may include grouping, or clustering, the filtered baseline acoustic emission data to group, or cluster, filtered baseline acoustic emission data that is indicative of similar, or identical, bondline physical changes. Stated differently, the filtered baseline acoustic emission data may include acoustic emission data that is characteristic of and/or generated by a plurality of different and/or distinct physical changes to the structural assembly, and the applying at 130 may include grouping the filtered acoustic emission data according to the type of physical change of which it is indicative. This is illustrated in FIG. 15, where three different clusters 35 generally are indicated.

Figure 14:
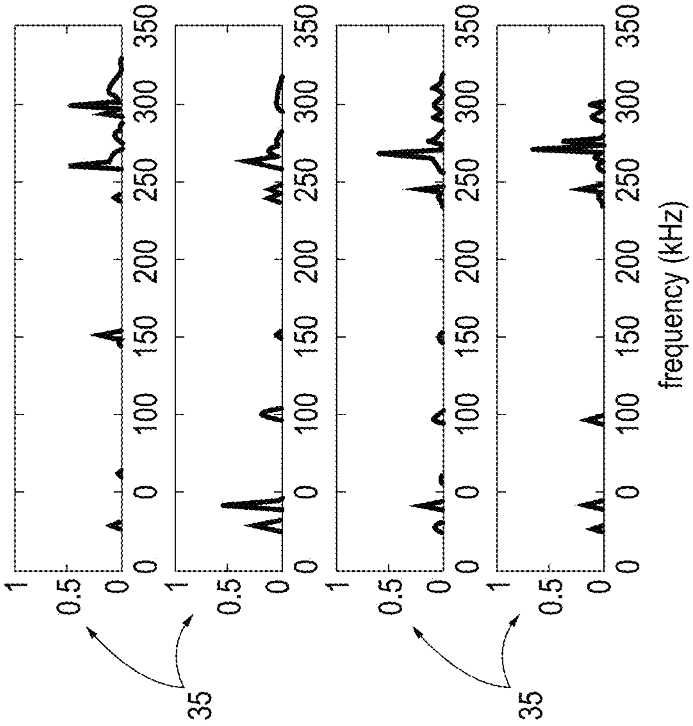
FIG. 14 illustrates an example of a classification dataset according to the present disclosure.

When the applying at 130 includes the determining the frequency distribution function of the filtered baseline acoustic emission data, the applying at 130 further may include grouping, or clustering, the frequency distribution function. This is illustrated in FIG. 14, with various clusters of frequency distribution data being indicated at 35.

The grouping and/or clustering may be performed in any suitable manner. As an example, the grouping and/or clustering may be performed with, via, and/or utilizing the unsupervised learning algorithm. As another example, the grouping and/or clustering may be performed with, via, and/or utilizing K-means clustering of the frequency distribution function.

In some examples, the applying at 130 further may include training a supervised learning algorithm to analyze experimental acoustic emission data. This may include training the supervised learning algorithm with, or on, the classification dataset. In some such examples, the training may include training a linear support vector machine to analyze the experimental acoustic data.

Repeating at 140 may include repeating any suitable step and/or steps of methods 100. As an example, and as discussed, the repeating at 140 may include repeating the receiving at 110, the filtering at 120, and/or the applying at 130 for each baseline structural assembly of the plurality of baseline structural assemblies. Stated differently, the classification dataset generated during methods 100 may include baseline acoustic emission data from the plurality of baseline structural assemblies, thereby permitting and/or facilitating generation of a comprehensive and/or statistically significant classification dataset and/or permitting and/or facilitating effective training of the supervised leaning algorithm with the classification dataset.

In some examples, methods 100, or the repeating at 140, may include performing the receiving at 110, the filtering at 120, and the applying at 130 on one or more pristine baseline structural assemblies that include corresponding pristine bondlines. The corresponding pristine bondlines of the pristine baseline structural assemblies may be free from the physical change, may not exhibit the physical change when subject to the validation condition, and/or may not degrade when subject to the validation condition. Stated differently, the classification dataset may include baseline acoustic emission data from baseline structural assemblies that exhibit one or more physical changes within the corresponding baseline bondline upon being subject to the validation condition, as well as baseline acoustic emission data from pristine baseline structural assemblies that do not exhibit physical changes, or at least physical changes that are associated with degradation of the corresponding pristine bondlines, upon being subject to the validation condition. Such a configuration may permit the classification dataset to identify both characteristics of the filtered baseline acoustic emission data that that are indicative of the physical change as well as characteristics of the filtered baseline acoustic emission data that are not indicative of the physical change and/or that are indicative of structural assemblies that to not exhibit and/or experience the physical change.

In some examples, and as discussed, acoustic evaluation system 10 and/or analyzer module 70 of FIG. 2 may be configured to be utilized with methods 100 and/or to perform one or more steps of methods 100. In such examples, structural assembly 80 also may be referred to herein as a baseline structural assembly 80, bondline 90 also may be referred to herein as a baseline bondline 90, and/or acoustic emission data 34 also may be referred to herein as baseline acoustic emission data 34. Additionally or alternatively, the filtered acoustic emission data also may be referred to herein as filtered baseline acoustic emission data, bondline-proximate subset 40 also may be referred to herein as a baseline bondline-proximate subset 40, and/or bondline-distal subset 42 also may be referred to herein as a baseline bondline-distal subset 42.

Figure 16:
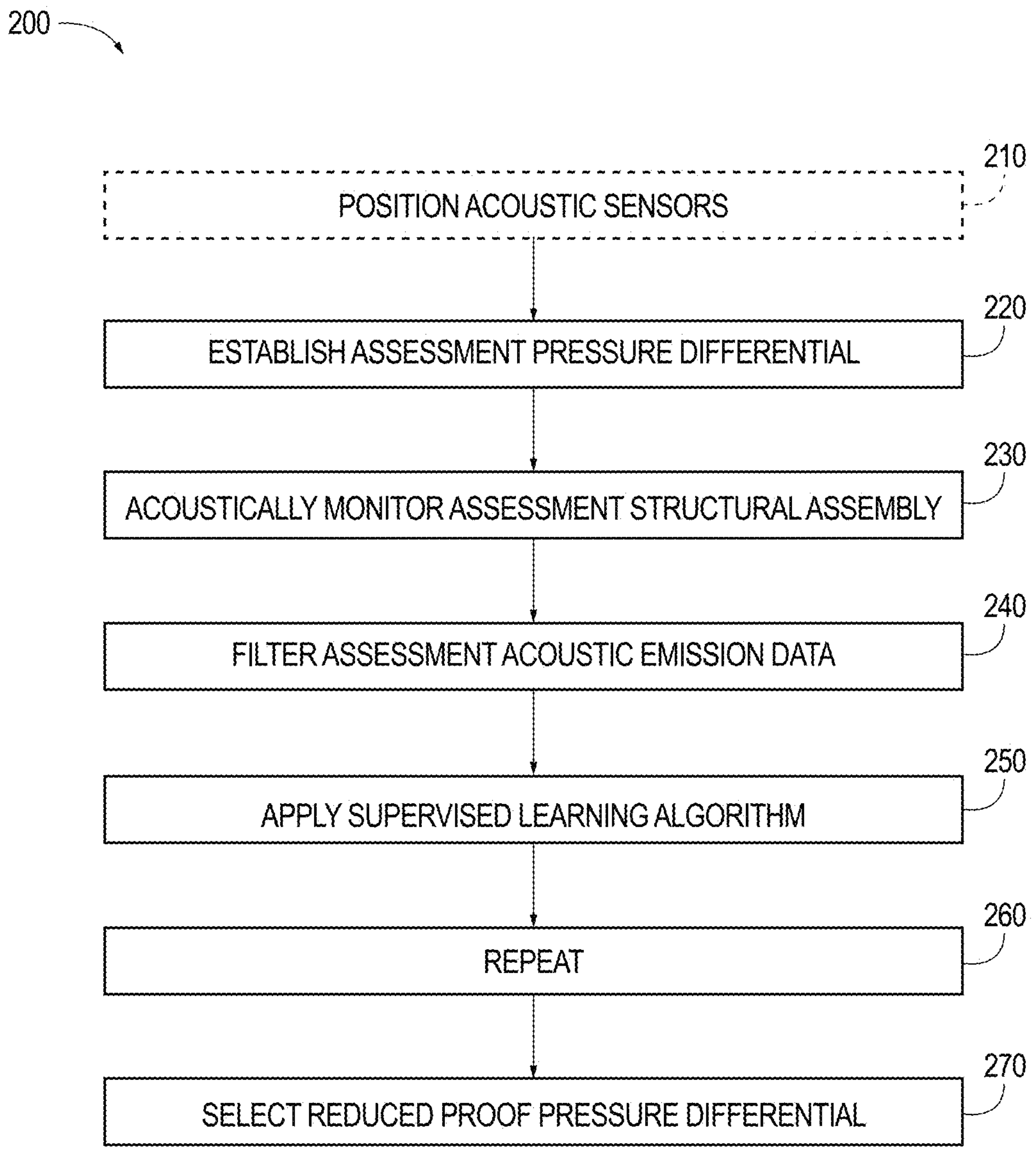
FIG. 16 is a flowchart depicting examples of methods of establishing a reduced proof pressure differential for proof testing of a structural assembly that includes a bondline, according to the present disclosure.

FIG. 16 is a flowchart depicting examples of methods 200 of establishing a reduced proof pressure differential for proof testing of a structural assembly that includes a bondline, according to the present disclosure. As discussed, proof testing may be utilized to validate functionality and/or integrity of structural assemblies under conditions that approximate real-world conditions experienced during operative use thereof. As also discussed, certain proof tests may be performed by generating a pressure differential across the structural assembly, such as between an interior region of the structural assembly and an exterior region of the structural assembly. Degradation of the structural assembly during conventional proof testing may be detected as a catastrophic failure of the structural assembly, which may have detrimental secondary effects.

With the above in mind, and as used herein, the phrase “proof pressure differential” or a “conventional proof pressure differential” refers to a pressure differential that is at least as large as a pressure differential that is expected to be experienced as a result of real-world operating conditions imposed on the structural assembly. In addition, and as used herein, the phrase “reduced proof pressure differential” refers to a pressure differential that is less than the “proof pressure differential” or that is less than the “conventional proof pressure differential.” In addition, the “reduced proof pressure differential” is determined and/or established utilizing methods 200. By way of reference, and when the structural assemblies include aircraft canopies, the proof pressure differential, or the conventional proof pressure differential, generally is on the order of 48 kilopascals. As discussed, this proof pressure differential is significantly larger than nominal operating pressure differentials, which generally are on the order of 34 kilopascals.

Methods 200 may include positioning acoustic sensors at 210 and include establishing an assessment pressure differential at 220 and acoustically monitoring an assessment structural assembly at 230. Methods 200 also include filtering assessment acoustic emission data at 240, applying a supervised learning algorithm at 250, and/or repeating at 260. Methods 200 further include selecting the reduced proof pressure differential at 270. Examples of the structural assemblies and/or of the assessment structural assembly are disclosed herein with reference to structural assemblies 80. Methods 100 may be performed with, via, and/or utilizing any suitable component and/or components of acoustic evaluation systems 10, which are disclosed herein.

Positioning the acoustic sensors at 210 may include positioning a plurality of acoustic sensors in acoustic communication with the assessment structural assembly. This may include attaching the plurality of acoustic sensors to the assessment structural assembly, adhering the plurality of acoustic sensors to the assessment structural assembly, and/or retaining the plurality of acoustic sensors in acoustic communication with the assessment structural assembly, such as utilizing a sensor support structure, examples of which are disclosed herein with reference to sensor support structure 60. In some examples, the positioning at 210 may include positioning utilizing a template, examples of which are disclosed herein with reference to template 50. In some examples, the positioning at 210 may include positioning an assessment bondline-proximate subset of the plurality of acoustic sensors relatively proximate the assessment bondline and/or positioning an assessment bondline-distal subset of the plurality of acoustic sensors relatively distal the assessment bondline.

Establishing the assessment pressure differential at 220 may include establishing the assessment pressure differential between an interior region of an assessment structural assembly and an exterior region of the assessment structural assembly. This may be accomplished in any suitable manner. As examples, the establishing at 220 may include evacuating the exterior region of the assessment structural assembly and/or pressurizing the interior region of the assessment structural assembly. In some examples, the establishing at 220 may include fluidically isolating the interior region and the exterior region from one another, such as utilizing an isolation structure, examples of which are disclosed herein with reference to isolation structure 22.

Acoustically monitoring the assessment structural assembly at 230 may be performed during the establishing at 220 and may include acoustically monitoring the assessment structural assembly to produce and/or generate assessment acoustic emission data. The acoustically monitoring at 230 may be performed in any suitable manner. As an example, the acoustically monitoring at 230 may include acoustically monitoring with, via, and/or utilizing the plurality of acoustic sensors. In some such examples, the plurality of acoustic sensors may be referred to herein as and/or may be a plurality of assessment acoustic sensors.

Filtering the assessment acoustic emission data at 240 may include filtering the assessment acoustic emission data to generate filtered assessment acoustic emission data. The filtered assessment acoustic emission data includes an assessment bondline-proximate subset of the assessment acoustic emission data and excludes an assessment bondline-distal subset of the assessment acoustic emission data. The assessment bondline-proximate subset of the assessment acoustic emission data may be generated relatively proximate, or within, the assessment bondline. Additionally or alternatively, the assessment bondline-distal subset of the assessment acoustic emission data may be generated relatively distal, or external, the assessment bondline.

As discussed the plurality of acoustic sensors may include the assessment bondline-proximate subset of the plurality of acoustic sensors and the assessment bondline-distal subset of the plurality of acoustic sensors. In such examples, the assessment bondline-proximate subset of the acoustic emission data may include assessment acoustic emission data initially detected by the assessment bondline-proximate subset of the plurality of acoustic sensors. Similarly, the assessment bondline-distal subset of the acoustic emission data may include assessment acoustic emission data initially detected by the assessment bondline-distal subset of the plurality of acoustic sensors.

Applying the supervised learning algorithm at 250 may include applying a supervised learning algorithm trained on a classification dataset to the filtered assessment acoustic emission data. This may include applying the supervised learning algorithm to identify characteristics of the filtered assessment acoustic emission data that are indicative of a physical change to an assessment bondline of the assessment structural assembly.

In some examples, the applying at 250 may include determining that the filtered assessment acoustic emission data includes characteristics indicative of the physical change to the assessment bondline. Stated differently, the applying at 250 may include determining that the physical change occurred in the assessment bondline based upon the presence, in the filtered assessment acoustic emission data, of the characteristics indicative of the physical change to the assessment bondline. In some such examples, the determining includes determining an intensity of the characteristics indicative of the physical change to the assessment bondline and/or determining a signal-to-noise ratio of the characteristics indicative of the physical change to the assessment bondline.

In some examples, the applying at 250 may include determining that the filtered assessment acoustic emission data excludes characteristics indicative of the physical change to the assessment bondline. Stated differently, the applying at 250 may include determining that the physical change did not occur in the assessment bondline based upon the absence, in the filtered assessment acoustic emission data, of the characteristics indicative of the physical change to the assessment bondline.

The applying at 250 may include applying any suitable supervised learning algorithm. As an example, the applying at 250 may include applying a linear support vector machine to the filtered assessment acoustic emission data.

It is within the scope of the present disclosure that the supervised learning algorithm may be trained on any suitable classification dataset in any suitable manner. As an example, the supervised learning algorithm may be trained with, via, and/or utilizing the classification dataset generated via methods 100 and/or by performing any suitable step and/or steps of methods 100. In a specific example, methods 200 further may include training the supervised learning algorithm. This may include training utilizing any suitable step and/or steps of methods 100.

Repeating at 260 may include repeating the establishing at 220, the acoustically monitoring at 230, the filtering at 240, and the applying at 250 at a plurality of distinct assessment pressure differentials. This may include repeating to generate a proof pressure differential database that includes each assessment pressure differential of the plurality of distinct assessment pressure differentials and correspondingly identified characteristics of corresponding filtered assessment acoustic emission data indicative of the physical change to the assessment bondline.

Each assessment proof pressure differential may be less than the proof pressure differential, or the conventional proof pressure differential, for the structural assembly. As examples, each assessment proof pressure differential may be a threshold multiple of the proof pressure differential, or the conventional proof pressure differential, for the structural assembly. Examples of the threshold multiple include at least 5%, at least 10%, at least 15%, at least 20%, at least 25%, at least 30%, at least 35%, at least 40%, at least 45%, at least 50, at most 95%, at most 90%, at most 85%, at most 80%, at most 75%, at most 70%, at most 65%, at most 60%, at most 55%, at most 50%, at most 45%, at most 40%, at most 35%, at most 30%, at most 25%, and/or at most 20%.

The repeating at 260 may include transitioning among the plurality of distinct assessment pressure differentials in any suitable manner. As an example, the repeating at 260 may include monotonically changing the assessment pressure differential for each instance of the repeating at 260. As another example, the repeating at 260 may include monotonically decreasing the assessment pressure differential from a maximum assessment pressure differential to a minimum assessment pressure differential. As another example, the repeating at 260 may include monotonically increasing the assessment pressure differential from the minimum assessment pressure differential to the maximum assessment pressure differential.

Selecting the reduced proof pressure differential at 270 may include selecting the reduced proof pressure differential for the structural assembly based, at least in part, on the proof pressure differential database. This may be accomplished in any suitable manner. As examples, the selecting at 270 may include selecting based, at least in part, on a minimum assessment pressure differential of the plurality of distinct assessment pressure differentials that includes characteristics indicative of the physical change to the assessment bondline, a desired intensity of the characteristics indicative of the physical change to the assessment bondline, and/or a desired signal-to-noise ratio of the characteristics indicative of the physical change to the assessment bondline. As another example, the selecting at 270 may include selecting a reduced proof pressure differential magnitude of at least 5 kilopascals (kPa), at least 10 kPa, at least 15 kPa, at least 20 kPa, at least 25 kPa, at least 30 kPa, at least 35 kPa, at least 40 kPa, at most 45 kPa, at most 40 kPa, at most 35 kPa, at most 30 kPa, at most 25 kPa, and/or at most 20 kPa.

In some examples, and as discussed, acoustic evaluation system 10 and/or analyzer module 70 of FIG. 2 may be configured to be utilized with methods 200 and/or to perform one or more steps of methods 200. In such examples, structural assembly 80 also may be referred to herein as an assessment structural assembly 80, bondline 90 also may be referred to herein as an assessment bondline 90, and/or acoustic emission data 34 also may be referred to herein as assessment acoustic emission data 34. Additionally or alternatively, the filtered acoustic emission data also may be referred to herein as filtered assessment acoustic emission data, bondline-proximate subset 40 also may be referred to herein as an assessment bondline-proximate subset 40, and/or bondline-distal subset 42 also may be referred to herein as an assessment bondline-distal subset 42.

Figure 17:
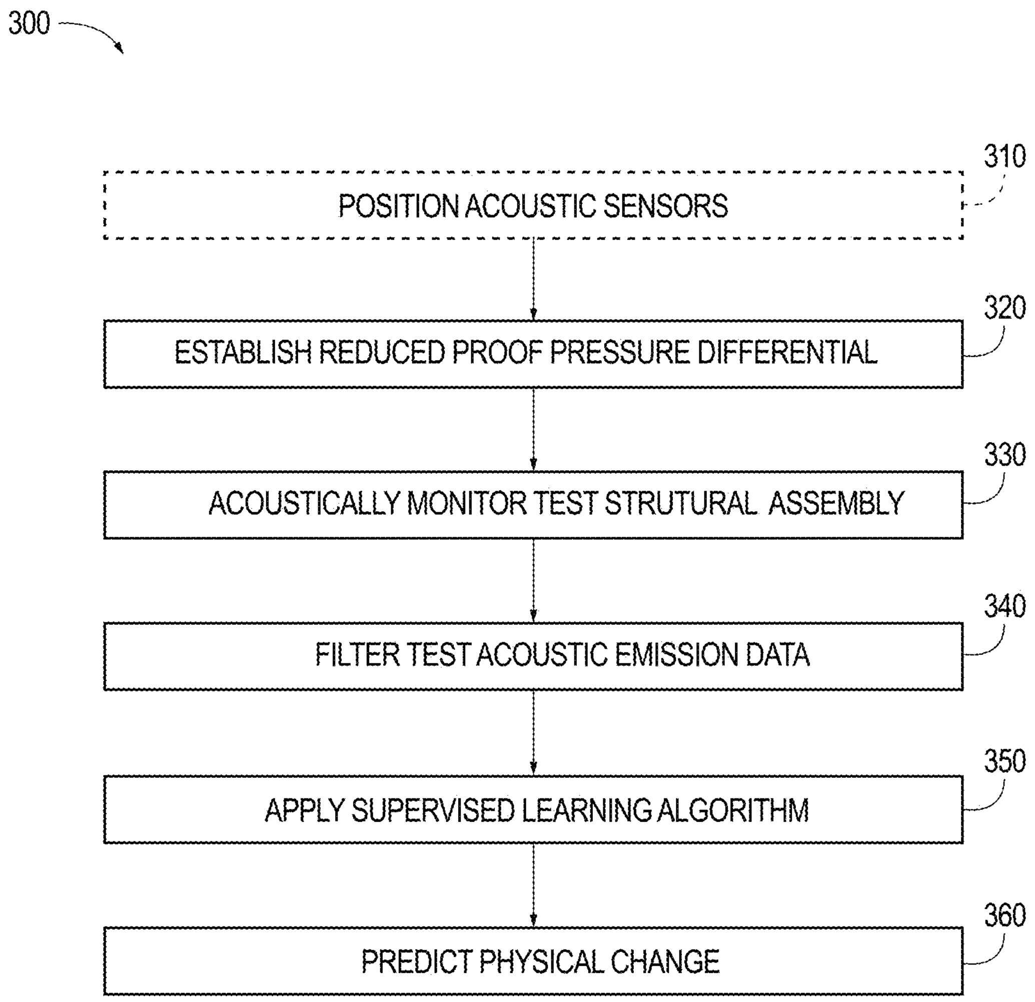
FIG. 17 is a flowchart depicting examples of methods of proof testing a test structural assembly, which includes a test bondline, at a reduced proof pressure differential, according to the present disclosure.

FIG. 17 is a flowchart depicting examples of methods 300 of proof testing a test structural assembly, which includes a test bondline, at a reduced proof pressure differential, according to the present disclosure. Methods 300 may include positioning acoustic sensors at 310 and include establishing a reduced proof pressure differential at 320 and acoustically monitoring the test structural assembly at 330. Methods 300 also include filtering test acoustic emission data at 340, applying a supervised learning algorithm at 350, and predicting a physical change at 360. Examples of the test structural assembly are disclosed herein with reference to structural assemblies 80. Methods 300 may be performed with, via, and/or utilizing any suitable component and/or components of acoustic evaluation systems 10, which are disclosed herein.

Positioning the acoustic sensors at 310 may include positioning a plurality of acoustic sensors in acoustic communication with the test structural assembly. This may include attaching the plurality of acoustic sensors to the test structural assembly, adhering the plurality of acoustic sensors to the test structural assembly, and/or retaining the plurality of acoustic sensors in acoustic communication with the test structural assembly, such as utilizing a sensor support structure, examples of which are disclosed herein with reference to sensor support structure 60. The positioning at 310 may include manually positioning at least a manually positioned subset of the plurality of acoustic sensors and/or robotically positioning at least a robotically positioned subset of the plurality of acoustic sensors.

In some examples, the positioning at 310 may include positioning utilizing a template, examples of which are disclosed herein with reference to template 50. This may include utilizing the template to accurately and/or precisely position the plurality of acoustic sensors at a corresponding plurality of spaced-apart sensing locations.

In some examples, the positioning at 310 may include adhering the plurality of acoustic sensors to the test structural assembly. In some examples, the positioning at 310 may include positioning the plurality of acoustic sensors without adhering the plurality of acoustic sensors to the test structural assembly. In some examples, the positioning at 310 may include positioning an acoustic transfer material between the plurality of acoustic sensors and the test structural assembly. Examples of the acoustic transfer material are disclosed herein with reference to acoustic transfer material 38.

In some examples, the positioning at 310 may include positioning a test bondline-proximate subset of the plurality of acoustic sensors relatively proximate the test bondline. In such examples, the positioning at 310 also may include positioning a test bondline-distal subset of the plurality of acoustic sensors relatively distal the test bondline.

Establishing the reduced proof pressure differential at 320 may include establishing the reduced proof pressure differential between an interior region of the test structural assembly and an exterior region of the test structural assembly. This may be accomplished in any suitable manner. As examples, the establishing at 320 may include evacuating the exterior region of the test structural assembly and/or pressurizing the interior region of the test structural assembly. In some examples, the establishing at 320 may include fluidically isolating the interior region and the exterior region from one another, such as utilizing an isolation structure, examples of which are disclosed herein with reference to isolation structure 22. The reduced proof pressure may be calculated, determined, and/or quantified in any suitable manner, such as via performing any suitable step and/or steps of methods 200, which are discussed in more detail herein.

Acoustically monitoring the assessment structural assembly at 330 may be performed during the establishing at 320 and may include acoustically monitoring the test structural assembly to produce and/or generate test acoustic emission data. The acoustically monitoring at 330 may be performed in any suitable manner. As an example, the acoustically monitoring at 330 may include acoustically monitoring with, via, and/or utilizing the plurality of acoustic sensors. In some such examples, the plurality of acoustic sensors may be referred to herein as and/or may be a plurality of test acoustic sensors.

Filtering the test acoustic emission data at 340 may include filtering the test acoustic emission data to generate filtered test acoustic emission data. The filtered test acoustic emission data includes a test bondline-proximate subset of the test acoustic emission data and excludes a test bondline-distal subset of the test acoustic emission data. The test bondline-proximate subset of the test acoustic emission data may be generated relatively proximate, or within, the test bondline. Additionally or alternatively, the test bondline-distal subset of the test acoustic emission data may be generated relatively distal, or external, the test bondline.

As discussed, the plurality of acoustic sensors may include the test bondline-proximate subset of the plurality of acoustic sensors and the test bondline-distal subset of the plurality of acoustic sensors. In such examples, the test bondline-proximate subset of the acoustic emission data may include test acoustic emission data initially detected by the test bondline-proximate subset of the plurality of acoustic sensors. Similarly, the test bondline-distal subset of the acoustic emission data may include test acoustic emission data initially detected by the test bondline-distal subset of the plurality of acoustic sensors.

Applying the supervised learning algorithm at 350 may include applying a supervised learning algorithm trained on a classification dataset to the filtered test acoustic emission data. This may include applying the supervised learning algorithm to identify characteristics of the filtered test acoustic emission data that are indicative of a physical change to the test bondline of the test structural assembly.

In some examples, the applying at 350 may include determining that the filtered test acoustic emission data includes characteristics indicative of the physical change to the test bondline. Stated differently, the applying at 350 may include determining that the physical change occurred in the test bondline based upon the presence, in the filtered test acoustic emission data, of the characteristics indicative of the physical change to the test bondline.

In some examples, the applying at 350 may include determining that the filtered test acoustic emission data excludes characteristics indicative of the physical change to the test bondline. Stated differently, the applying at 350 may include determining that the physical change did not occur in the test bondline based upon the absence, in the filtered test acoustic emission data, of the characteristics indicative of the physical change to the test bondline.

The applying at 350 may include applying any suitable supervised learning algorithm. As an example, the applying at 350 may include applying a linear support vector machine to the filtered test acoustic emission data.

It is within the scope of the present disclosure that the supervised learning algorithm may be trained on any suitable classification dataset in any suitable manner. As an example, the supervised learning algorithm may be trained with, via, and/or utilizing the classification dataset generated via methods 100 and/or by performing any suitable step and/or steps of methods 100. In a specific example, methods 300 further may include training the supervised learning algorithm. This may include training utilizing any suitable step and/or steps of methods 100.

Predicting the physical change at 360 may include predicting the physical change to the test bondline when the filtered test acoustic emission data includes, or responsive to the filtered test acoustic emission data including, characteristics indicative of the physical change to the test bondline. The predicting at 360 may include predicting based upon any suitable criteria. As examples, the predicting at 360 may include predicting the physical change to the test bondline when the filtered test acoustic emission data includes any characteristics indicative of the physical change to the test bondline and/or when the filtered test acoustic emission data includes at least a threshold quantity of characteristics indicative of the physical change to the test bondline. The predicting at 360 additionally or alternatively may include predicting that the test bondline has sufficient structural integrity when the filtered test acoustic emission data is free from, or free from any, characteristics indicative of the physical change to the test bondline.

In some examples, and as discussed, acoustic evaluation system 10 and/or analyzer module 70 of FIG. 2 may be configured to be utilized with methods 300 and/or to perform one or more steps of methods 300. In such examples, structural assembly 80 also may be referred to herein as a test structural assembly 80, bondline 90 also may be referred to herein as a test bondline 90, and/or acoustic emission data 34 also may be referred to herein as test acoustic emission data 34. Additionally or alternatively, the filtered acoustic emission data also may be referred to herein as filtered test acoustic emission data, bondline-proximate subset 40 also may be referred to herein as a test bondline-proximate subset 40, and/or bondline-distal subset 42 also may be referred to herein as a test bondline-distal subset 42.

Illustrative, non-exclusive examples of inventive subject matter according to the present disclosure are described in the following enumerated paragraphs:

A1. A method (100) of characterizing bondline integrity of structural assemblies (80), the method (100) comprising:

for each baseline structural assembly (80) of a plurality of baseline structural assemblies (80):

(i) receiving (110) baseline acoustic emission data (34) generated during validation of each baseline structural assembly (80), wherein each baseline structural assembly (80) includes a corresponding baseline bondline (90), and further wherein at least a subset of the baseline acoustic emission data (34) is generated during a physical change (81) to the corresponding baseline bondline (90);

(ii) filtering (120) the baseline acoustic emission data (34) to generate filtered baseline acoustic emission data (34) that includes a baseline bondline-proximate subset of the baseline acoustic emission data (34) generated relatively proximate, or within, the corresponding baseline bondline (90) and excludes a baseline bondline-distal subset of the baseline acoustic emission data (34) generated relatively distal, or external, the corresponding baseline bondline (90); and (iii) applying (130) an unsupervised learning algorithm to the filtered baseline acoustic emission data (34) to generate a classification dataset that identifies at least one characteristic of the filtered baseline acoustic emission data (34) that is indicative of the physical change (81) to the corresponding baseline bondline (90) during validation of each baseline structural assembly (80).

A2. The method (100) of paragraph A1, wherein the receiving (110) the baseline acoustic emission data (34) includes receiving the baseline acoustic emission data (34) from a database of acoustic emission data (34).

A3. The method (100) of any of paragraphs A1-A2, wherein the receiving (100) the baseline acoustic emission data (34) includes generating the baseline acoustic emission data (34).

A4. The method (100) of paragraph A3, wherein the generating the baseline acoustic emission data (34) includes applying a validation condition to each baseline structural assembly (80).

A5. The method (100) of paragraph A4, wherein the validation condition includes at least one of solid wave propagation within each baseline structural assembly (80), energy transmission through each baseline structural assembly (80), mechanical energy transmission through each baseline structural assembly (80), thermal energy transmission through each baseline structural assembly (80), electrical energy transmission through each baseline structural assembly (80), a mechanically generated deformation force applied to each baseline structural assembly (80), a pneumatically generated deformation force applied to each baseline structural assembly (80), a hydraulically generated deformation force applied to each baseline structural assembly (80), and a pressure generated deformation force applied to each baseline structural assembly (80).

A6. The method (100) of any of paragraphs A1-A5, wherein the filtering (120) the baseline acoustic emission data (34) includes utilizing wave mechanics calculations to determine a plurality of emission locations within each baseline structural assembly (80), and for the baseline acoustic emission data (34), wherein the baseline bondline-proximate subset of the baseline acoustic emission data (34) includes baseline acoustic emission data (34) with bondline-proximate emission locations of the plurality of emission locations that are relatively proximate, or within, the corresponding baseline bondline (90), and further wherein the baseline bondline-distal subset of the baseline acoustic emission data (34) includes baseline acoustic emission data (34) with bondline-distal emission locations of the plurality of emission locations that are relatively distal, or external, the corresponding baseline bondline (90).

A7. The method (100) of any of paragraphs A1-A6, wherein at least one of:

(i) the baseline acoustic emission data (34) is generated by a plurality of acoustic sensors (32) in acoustic communication with each baseline structural assembly (80); and (ii) the receiving (110) the baseline acoustic emission data (34) includes generating the baseline acoustic emission data (34) utilizing the plurality of acoustic sensors (32) in acoustic communication with each baseline structural assembly (80).

A8. The method (100) of paragraph A7, wherein the plurality of acoustic sensors (32) is spaced-apart and supported on a surface (92) of each baseline structural assembly (80).

A9. The method (100) of any of paragraphs A7-A8, wherein the plurality of acoustic sensors (32) includes a baseline bondline-proximate subset (40) of the plurality of acoustic sensors (32) that is relatively proximate the baseline bondline (90) and a baseline bondline-distal subset (42) of the plurality of acoustic sensors (32) that is relatively distal the baseline bondline (90).

A10. The method (100) of paragraph A9, wherein the baseline bondline-proximate subset of the baseline acoustic emission data (34) includes baseline acoustic emission data (34) initially detected by the baseline bondline-proximate subset (40) of the plurality of acoustic sensors (32).

A11. The method (100) of any of paragraphs A9-A10, wherein the baseline bondline-distal subset of the baseline acoustic emission data (34) includes baseline acoustic emission data (34) initially detected by the baseline bondline-distal subset (42) of the plurality of acoustic sensors (32).

A12. The method (100) of any of paragraphs A1-A11, wherein the applying (130) the unsupervised learning algorithm includes determining at least one of:

(i) a frequency of the filtered baseline acoustic emission data (34) that is indicative of the physical change (81) to the corresponding baseline bondline (90);

(ii) an amplitude of the filtered baseline acoustic emission data (34) that is indicative of the physical change (81) to the corresponding baseline bondline (90);

(iii) a wavelength of the filtered baseline acoustic emission data (34) that is indicative of the physical change (81) to the corresponding baseline bondline (90);

(iv) an energy of the filtered baseline acoustic emission data (34) that is indicative of the physical change (81) to the corresponding baseline bondline (90);

(v) a cumulative energy of the filtered baseline acoustic emission data (34) that is indicative of the physical change (81) to the corresponding baseline bondline (90); and (vi) an energy per hit of the filtered baseline acoustic emission data (34) that is indicative of the physical change (81) to the corresponding baseline bondline (90).

A13. The method (100) of any of paragraphs A1-A12, wherein the applying (130) the unsupervised learning algorithm includes grouping, or clustering, the filtered baseline acoustic emission data (34) to group, or cluster, filtered baseline acoustic emission data (34) of the plurality of baseline structural assemblies (80) that is indicative of similar, or identical, bondline physical changes (81).

A14. The method (100) of any of paragraphs A1-A13, wherein the applying (130) the unsupervised learning algorithm includes determining a frequency distribution function of the filtered baseline acoustic emission data (34).

A15. The method (100) of paragraph A14, wherein the determining the frequency distribution function includes determining at least one of a Fourier transform of the filtered baseline acoustic emission data (34) and a fast Fourier transform of the filtered baseline acoustic emission data (34).

A16. The method (100) of any of paragraphs A14-A15, wherein the applying (130) the unsupervised learning algorithm further includes clustering the frequency distribution function.

A17. The method (100) of paragraph A16, wherein the clustering the frequency distribution function includes clustering utilizing the unsupervised learning algorithm.

A18. The method (100) of any of paragraphs A16-A17, wherein the clustering the frequency distribution function includes K-means clustering the frequency distribution function.

A19. The method (100) of any of paragraphs A16-A18, wherein the applying (130) the unsupervised learning algorithm further includes training a supervised learning algorithm to analyze experimental acoustic emission data (34).

A20. The method (100) of any of paragraphs A16-A19, wherein the applying (130) the learning algorithm further includes training a linear support vector machine to analyze experimental acoustic emission data (34).

A21. The method (100) of any of paragraphs A1-A20, wherein:

(i) the plurality of baseline structural assemblies (80) further includes at least one pristine baseline structural assembly (80) that includes a corresponding pristine bondline (90);

(ii) the receiving (110) the baseline acoustic emission data (34) further includes receiving corresponding pristine acoustic emission data (34) generated during validation of the pristine baseline structural assembly (80), wherein the pristine acoustic emission data (34) is generated without degradation of the corresponding pristine bondline (90);

(iv) the filtered baseline acoustic emission data (34) includes a baseline bondline-proximate subset of the corresponding pristine acoustic emission data (34) and excludes a baseline bondline-distal subset of the corresponding pristine acoustic emission data (34); and (iii) the classification dataset further identifies at least one characteristic of the filtered baseline acoustic emission data (34) that is indicative of validation of at least one pristine baseline structural assembly (80) without degradation of the corresponding pristine bondline (90).

A22. The method (100) of any of paragraphs A1-A21, wherein each baseline structural assembly (80) includes, or is, at least one of:

(i) a laboratory coupon;

(ii) a sub-assembly;

(iii) an assembled commercial component configured to be included within a commercial assembly; and (iv) an aircraft canopy (94) configured to be included within an aircraft (78), or a military aircraft.

A23. The method (100) of any of paragraphs A1-A22, wherein each baseline structural assembly (80) includes, or is:

(i) a frame (82);

(ii) a transparency (86); and (iii) a structural adhesive (88) that adheres the transparency (86) to the frame (82) to define the corresponding baseline bondline (90).

A24. The method (100) of paragraph A23, wherein the frame (82) defines a channel (84), wherein a region of the transparency (86) is received within the channel (84), and further wherein the structure adhesive (88) adheres the transparency (86) to the frame (82) within the channel (84).

A25. The method (100) of paragraph A24, wherein the channel (84) surrounds the region of the transparency (86) on three sides.

A26. The method (100) of any of paragraphs A23-A25, wherein the frame (82) is defined by a frame material, wherein the transparency (86) is defined by a transparency material that differs from the frame material, and further wherein the structure adhesive (88) is defined by a structure adhesive material that differs from both the frame material and the transparency material.

A27. The method (100) of paragraph A26, wherein the frame material includes, or is, a metallic frame material.

A28. The method (100) of any of paragraphs A26-A27, wherein the transparency material includes, or is, at least one of a polymeric transparency material, an acrylic transparency material, and a polycarbonate transparency material.

A29. The method (100) of any of paragraphs A26-A28, wherein the structure adhesive material includes, or is, at least one of a polymeric structure adhesive material and an epoxy structure adhesive material.

A30. The method (100) of any of paragraphs A1-A29, wherein the corresponding baseline bondline (90) includes at least one of:

(i) an interface region between two dissimilar materials of each baseline structural assembly (80); and (ii) an adhesion region between two dissimilar materials of each baseline structural assembly (80).

A31. The method (100) of any of paragraphs A1-A30, wherein the physical change (81) to the corresponding baseline bondline (90) includes at least one of:

(i) deformation of the corresponding baseline bondline (90);

(ii) damage initiation within the corresponding baseline bondline (90); and (iii) damage growth within the corresponding baseline bondline (90).

A32. The method (100) of any of paragraphs A1-A31, wherein the physical change (81) to the corresponding baseline bondline (90) includes degradation of the corresponding baseline bondline (90), optionally wherein the degradation of the corresponding baseline bondline (90) includes at least one of:

(i) a weak bond within the corresponding baseline bondline (90);

(ii) disbonding of the corresponding baseline bondline (90);

(iii) a kissing bond within the corresponding baseline bondline (90);

(iv) at least one void within the corresponding baseline bondline (90); and (v) an undesired bondline condition within the corresponding baseline bondline (90).

B1. A method (200) of establishing a reduced proof pressure differential for proof testing of a structural assembly (80) that includes a bondline (90), the method (200) comprising:

establishing (220) an assessment pressure differential between an interior region (96) of an assessment structural assembly (80) and an exterior region (98) of the assessment structural assembly (80);

during the establishing (220) the assessment pressure differential, acoustically monitoring (230) the assessment structural assembly (80) to generate assessment acoustic emission data (34);

filtering (240) the assessment acoustic emission data (34) to generate filtered assessment acoustic emission data (34) that includes an assessment bondline-proximate subset of the assessment acoustic emission data (34) and excludes an assessment bondline-distal subset of the assessment acoustic emission applying (250) a supervised learning algorithm trained on a classification dataset to the filtered assessment acoustic emission data (34) to identify characteristics of the filtered assessment acoustic emission data (34) indicative of a physical change (81) to an assessment bondline (90) of the assessment structural assembly (80);

repeating (260) the establishing (220), the acoustically monitoring (230), the filtering (240), and the applying (250) at a plurality of distinct assessment pressure differentials to generate a proof pressure differential database that includes each assessment pressure differential of the plurality of distinct assessment pressure differentials and correspondingly identified characteristics of corresponding filtered assessment acoustic emission data (34) indicative of the physical change (81) to the assessment bondline (90); and selecting (270) the reduced proof pressure differential for the structural assembly (80) based, at least in part, on the proof pressure differential database.

B2. The method (200) of paragraph B1, wherein the establishing (220) the assessment pressure differential includes at least one of:

(i) evacuating the exterior region (98) of the assessment structural assembly (80); and (ii) pressurizing the interior region (96) of the assessment structural assembly (80).

B3. The method (200) of any of paragraphs B1-B2, wherein the establishing (220) the assessment pressure differential includes fluidically isolating the interior region (96) and the exterior region (98) from one another.

B4. The method (200) of any of paragraphs B1-B3, wherein the acoustically monitoring (230) includes acoustically monitoring utilizing a plurality of acoustic sensors (32).

B5. The method (200) of paragraph B4, wherein, prior to the acoustically monitoring (230), the method (200) further includes positioning (210) the plurality of acoustic sensors (32) in acoustic communication with the assessment structural assembly (80).

B6. The method (200) of any of paragraphs B4-B5, wherein the plurality of acoustic sensors (32) is spaced-apart and supported on a surface (92) of the assessment structural assembly (80).

B7. The method (200) of any of paragraphs B4-B6, wherein the plurality of acoustic sensors (32) includes an assessment bondline-proximate subset (40) of the plurality of acoustic sensors (32) that is relatively proximate the assessment bondline (90) and an assessment bondline-distal subset of the plurality of acoustic sensors (32) that is relatively distal the assessment bondline (90).

B8. The method (200) of paragraph B7, wherein the assessment bondline-proximate subset of the assessment acoustic emission data (34) includes assessment acoustic emission data (34) initially detected by the assessment bondline-proximate subset (40) of the plurality of acoustic sensors (32).

B9. The method (200) of any of paragraphs B7-B8, wherein the assessment bondline-distal subset of the assessment acoustic emission data (34) includes assessment acoustic emission data (34) initially detected by the assessment bondline-distal subset (42) of the plurality of acoustic sensors (32).

B10. The method (200) of any of paragraphs B1-B9, wherein the assessment bondline-proximate subset of the assessment acoustic emission data (34) is generated relatively proximate, or within, the assessment bondline (90).

B11. The method (200) of any of paragraphs B1-B10, wherein the assessment bondline-distal subset of the assessment acoustic emission data (34) is generated relatively distal, or external, the assessment bondline (90).

B12. The method (200) of any of paragraphs B1-B11, wherein the applying (250) the supervised learning algorithm includes determining that the filtered assessment acoustic emission data (34) includes characteristics indicative of the physical change (81) to the assessment bondline (90).

B13. The method (200) of paragraph B12, wherein the determining that the filtered assessment acoustic emission data (34) includes characteristics indicative of the physical change (81) to the assessment bondline (90) further includes determining at least one of:

(i) an intensity of the characteristics indicative of the physical change (81) to the assessment bondline (90); and (ii) a signal-to-noise ratio of the characteristics indicative of the physical change (81) to the assessment bondline (90).

B14. The method (200) of any of paragraphs B1-B13, wherein the applying (250) the supervised learning algorithm includes determining that the filtered assessment acoustic emission data (34) excludes characteristics indicative of the physical change (81) to the assessment bondline (90).

B15. The method (200) of any of paragraphs B1-B14, wherein the applying (250) the supervised learning algorithm includes applying a linear support vector machine to the filtered assessment acoustic emission data (34).

B16. The method (200) of any of paragraphs B1-B15, wherein the supervised learning algorithm is trained utilizing any suitable step and/or steps of any of the methods (100) of any of paragraphs A1-A32.

B17. The method (200) of any of paragraphs B1-B16, wherein the method (200) further includes training the supervised learning algorithm utilizing any suitable step and/or steps of any of the methods (100) of any of paragraphs A1-A32.

B18. The method (200) of any of paragraphs B1-B17, wherein each assessment pressure differential is less than a proof pressure differential for the structural assembly (80).

B19. The method (200) of any of paragraphs B1-B18, wherein each assessment pressure differential is a threshold multiple of a/the proof pressure differential for the structural assembly (80), wherein the threshold multiple is at least one of:

(i) at least 5%, at least 10%, at least 15%, at least 20%, at least 25%, at least 30%, at least 35%, at least 40%, at least 45%, or at least 50%; and (ii) at most 95%, at most 90%, at most 85%, at most 80%, at most 75%, at most 70%, at most 65%, at most 60%, at most 55%, at most 50%, at most 45%, at most 40%, at most 35%, at most 30%, at most 25%, or at most 20%.

B20. The method (200) of any of paragraphs B1-B19, wherein the repeating (260) includes monotonically changing the assessment pressure differential.

B21. The method (200) of any of paragraphs B1-B20, wherein the repeating (260) includes monotonically decreasing the assessment pressure differential from a maximum assessment pressure differential to a minimum assessment pressure differential.

B22. The method (200) of any of paragraphs B1-B20, wherein the repeating (260) includes monotonically increasing the assessment pressure differential from a minimum assessment pressure differential to a maximum assessment pressure differential.

B23. The method (200) of any of paragraphs B1-B22, wherein the selecting (270) the reduced proof pressure differential for the structural assembly (80) includes selecting based, at least in part, on at least one of:

(i) a minimum assessment pressure differential of the plurality of distinct assessment pressure differentials that includes characteristics indicative of the physical change (81) to the assessment bondline (90);

(ii) a desired intensity of the characteristics indicative of the physical change (81) to the assessment bondline (90); and (iii) a desired signal-to-noise ratio of the characteristics indicative of the physical change (81) to the assessment bondline (90).

B24. The method (200) of any of paragraphs B1-B23, wherein the selecting (270) the reduced proof pressure differential includes selecting a reduced proof pressure differential magnitude of at least one of:

(i) at least 5 kilopascals (kPa), at least 10 kPa, at least 15 kPa, at least 20 kPa, at least 25 kPa, at least 30 kPa, at least 35 kPa, or at least 40 kPa; and (ii) at most 45 kPa, at most 40 kPa, at most 35 kPa, at most 30 kPa, at most 25 kPa, or at most 20 kPa.

B25. The method (200) of any of paragraphs B1-B24, wherein the assessment structural assembly (80) includes, or is, at least one of:

(i) an assembled commercial component configured to be included within a commercial assembly; and (ii) an aircraft canopy (94) configured to be included within an aircraft (78), or a military aircraft.

B26. The method (200) of any of paragraphs B1-B25, wherein the assessment structural assembly (80) includes, or is:

(i) a frame (82);

(ii) a transparency (86); and (iii) a structure adhesive (88) that adheres the transparency (86) to the frame (82) to define the assessment bondline (90).

B27. The method (200) of paragraph B26, wherein the frame (82) defines a channel (84), wherein a region of the transparency (86) is received within the channel (84), and further wherein the structure adhesive adheres the transparency (86) to the frame (82) within the channel (84).

B28. The method of paragraph B27, wherein the channel (84) surrounds the region of the transparency (86) on three sides.

B29. The method of any of paragraphs B26-B28, wherein the frame (82) is defined by a frame material, wherein the transparency (86) is defined by a transparency material that differs from the frame material, and further wherein the structure adhesive (88) is defined by a structure adhesive material that differs from both the frame material and the transparency material.

B30. The method of paragraph B29, wherein the frame material includes, or is, a metallic frame material.

B31. The method of any of paragraphs B29-B30, wherein the transparency material includes, or is, at least one of a polymeric transparency material, an acrylic transparency material, and a polycarbonate transparency material.

B32. The method of any of paragraphs B29-B31, wherein the structure adhesive material includes, or is, at least one of a polymeric structure adhesive material and an epoxy structure adhesive material.

B33. The method (200) of any of paragraphs B1-B32, wherein the assessment bondline (90) includes at least one of:

(i) an interface region between two dissimilar materials of the assessment structural assembly (80); and (ii) an adhesion region between two dissimilar materials of the assessment structural assembly (80).

C1. A method (300) of proof testing a test structural assembly (80), which includes a test bondline (90), at a reduced proof pressure differential, the method (300) comprising:

establishing (320) the reduced proof pressure differential between an interior region (96) of the test structural assembly (80) and an exterior region (98) of the test structural assembly (80);

during the establishing (320) the reduced proof pressure differential, acoustically monitoring (330) the test structural assembly (80) to generate test acoustic emission data (34);

filtering (340) the test acoustic emission data (34) to generate filtered test acoustic emission data (34) that includes a test bondline-proximate subset of the test acoustic emission data (34) and excludes a test bondline-distal subset of the test acoustic emission data (34);

applying (350) a supervised learning algorithm trained on a classification dataset to the filtered test acoustic emission data (34) to identify characteristics of the filtered test acoustic emission data (34) indicative of a physical change (81) to the test bondline (90); and predicting (360) the physical change (81) to the test bondline (90) when the filtered test acoustic emission data (34) includes characteristics indicative of the physical change (81) to the test bondline (90).

C2. The method (300) of paragraph C1, wherein the establishing (320) the reduced proof pressure differential includes at least one of:

(i) evacuating the exterior region (98) of the test structural assembly (80); and (ii) pressurizing the interior region (96) of the test structural assembly (80).

C3. The method (300) of any of paragraphs C1-C2, wherein the establishing (320) the reduced proof pressure differential includes fluidically isolating the interior region (96) and the exterior region (98) from one another.

C4. The method (300) of any of paragraphs $C_1$-$C_3$, wherein the reduced proof pressure is determined utilizing the method (200) of any of paragraphs B1-B33.

C4. The method (300) of any of paragraphs $C_1$-$C_3$, wherein the acoustically monitoring (330) includes acoustically monitoring utilizing a plurality of acoustic sensors (32).

C5. The method (300) of paragraph C4, wherein, prior to the acoustically monitoring (330), the method (300) further includes positioning (310) the plurality of acoustic sensors (32) in acoustic communication with the test structural assembly (80).

C6. The method (300) of paragraph C5, wherein the positioning (310) includes at least one of:

(i) manually positioning at least a manually positioned subset of the plurality of acoustic sensors (32); and (ii) robotically positioning at least a robotically positioned subset of the plurality of acoustic sensors (32).

C7. The method (300) of any of paragraphs C5-C6, wherein the positioning (310) the plurality of acoustic sensors (32) includes utilizing a template (50) to accurately position the plurality of acoustic sensors (32) at a corresponding plurality of spaced-apart sensing locations.

C8. The method (300) of any of paragraphs C5-C7, wherein the positioning (310) the plurality of acoustic sensors (32) includes retaining the plurality of acoustic sensors (32) in acoustic communication with the test structural assembly (80) utilizing a sensor support structure (60) that is distinct from the test structural assembly (80).

C9. The method (300) of any of paragraphs C5-C8, wherein the positioning (310) the plurality of acoustic sensors (32) includes adhering the plurality of acoustic sensors (32) to the test structural assembly (80).

C10. The method (300) of any of paragraphs C5-C8, wherein the positioning (310) the plurality of acoustic sensors (32) includes positioning without adhering the plurality of acoustic sensors (32) to the test structural assembly (80).

C11. The method (300) of any of paragraphs C5-C10, wherein the positioning (310) the plurality of acoustic sensors (32) includes positioning an acoustic transfer material (38) between the plurality of acoustic sensors (32) and the test structural assembly (80), optionally wherein the acoustic transfer material (38) includes at least one of a grease, an oil, petroleum jelly, and mineral oil.

C12. The method (300) of any of paragraphs C4-C11, wherein the plurality of acoustic sensors (32) is spaced-apart and supported on a surface (92) of the test structural assembly (80).

C13. The method (300) of any of paragraphs C4-C12, wherein the plurality of acoustic sensors (32) includes a test bondline-proximate subset (40) of the plurality of acoustic sensors (32) that is relatively proximate the test bondline (90) and a test bondline-distal subset of the plurality of acoustic sensors (32) that is relatively distal the test bondline (90).

C14. The method (300) of paragraph C13, wherein the test bondline-proximate subset of the test acoustic emission data (34) includes test acoustic emission data (34) initially detected by the test bondline-proximate subset (40) of the plurality of acoustic sensors (32).

C15. The method (300) of any of paragraphs C13-C14, wherein the test bondline-distal subset of the test acoustic emission data (34) includes test acoustic emission data (34) initially detected by the test bondline-distal subset (42) of the plurality of acoustic sensors (32).

C16. The method (300) of any of paragraphs C1-C15, wherein the test bondline-proximate subset of the test acoustic emission data (34) is generated relatively proximate, or within, the test bondline (90).

C17. The method (300) of any of paragraphs C1-C16, wherein the test bondline-distal subset of the test acoustic emission data (34) is generated relatively distal, or external, the test bondline (90).

C18. The method (300) of any of paragraphs C1-C17, wherein the applying (350) the supervised learning algorithm includes determining that the filtered test acoustic emission data (34) includes characteristics indicative of the physical change (81) to the test bondline (90), and further wherein the predicting the physical change (81) is responsive to the determining that the filtered test acoustic emission data (34) includes characteristics indicative of the physical change (81) to the test bondline (90).

C19. The method (300) of any of paragraphs C1-C18, wherein the applying (350) the supervised learning algorithm includes determining that the filtered test acoustic emission data (34) excludes characteristics indicative of the physical change (81) to the test bondline (90).

C20. The method (300) of any of paragraphs C1-C19, wherein the applying (350) the supervised learning algorithm includes applying a linear support vector machine to the filtered test acoustic emission data (34).

C21. The method (300) of any of paragraphs C1-C20, wherein the supervised learning algorithm is trained utilizing any suitable step and/or steps of any of the methods (100) of any of paragraphs A1-A32.

C22. The method (300) of any of paragraphs C1-C21, wherein the method (300) further includes training the supervised learning algorithm utilizing any suitable step and/or steps of any of the methods (100) of any of paragraphs A1-A32.

C23. The method (300) of any of paragraphs C1-C22, wherein the predicting (360) the physical change (81) includes predicting the physical change (81) to the test bondline (90) when the filtered test acoustic emission data (34) includes at least one of:

(i) any characteristics indicative of the physical change (81) to the test bondline (90); and (ii) at least a threshold quantity of characteristics indicative of the physical change (81) to the test bondline (90).

C24. The method (300) of any of paragraphs C1-C23, wherein the predicting (360) the physical change (81) includes predicting that the test bondline (90) has sufficient structural integrity when the filtered test acoustic emission data (34) is free from any characteristics indicative of the physical change (81) to the test bondline (90).

C25. The method (300) of any of paragraphs C1-C24, wherein the test structural assembly (80) includes, or is, at least one of:

(i) an assembled commercial component configured to be included within a commercial assembly; and (ii) an aircraft canopy (94) configured to be included within an aircraft (78), or a military aircraft.

C26. The method (300) of any of paragraphs C1-C25, wherein the test structural assembly (80) includes, or is:

(i) a frame (82);

(ii) a transparency (86); and (iii) a structure adhesive (88) that adheres the transparency (86) to the frame (82) to define the test bondline (90).

C27. The method (300) of paragraph C26, wherein the frame (82) defines a channel (84), wherein a region of the transparency (86) is received within the channel (84), and further wherein the structure adhesive (88) adheres the transparency to the frame (82) within the channel (84).

C28. The method (300) of paragraph C27, wherein the channel (84) surrounds the region of the transparency (86) on three sides.

C29. The method (300) of any of paragraphs C26-C28, wherein the frame (82) is defined by a frame material, wherein the transparency (86) is defined by a transparency material that differs from the frame material, and further wherein the structure adhesive (88) is defined by a structure adhesive material that differs from the frame material and also from the transparency material.

C30. The method (300) of paragraph C29, wherein the frame material includes, or is, a metallic frame material.

C31. The method (300) of any of paragraphs C29-C30, wherein the transparency material includes, or is, at least one of a polymeric transparency material, an acrylic transparency material, and a polycarbonate transparency material.

C32. The method (300) of any of paragraphs C29-C31, wherein the structure adhesive material includes, or is, at least one of a polymeric structure adhesive material and an epoxy adhesive material.

C33. The method (300) of any of paragraphs C1-C32, wherein the test bondline (90) includes at least one of:

(i) an interface region between two dissimilar materials of the test structural assembly (80); and (ii) an adhesion region between two dissimilar materials of the test structural assembly (80).

D1. Non-transitory computer-readable storage media (72) including computer-executable instructions that, when executed, direct an analyzer module to perform the methods (100, 200, 300) of any of paragraphs A1-C33.

E1. An acoustic evaluation system (10) for acoustically evaluating a structural assembly (80) that includes a bondline (90), the acoustic evaluation system (10) comprising:

a validation structure (20) configured to apply a validation condition to the structural assembly (80);

an acoustic sensing system (30) including a plurality of acoustic sensors (32) configured to be positioned in acoustic communication with the structural assembly (80) and to generate acoustic emission data (34) indicative of acoustic emissions (33) from the structural assembly (80) during validation of the structural assembly (80) via the validation condition; and an analyzer module (70) programmed to receive the acoustic emission data (34) and to filter the acoustic emission data (34) to generate filtered acoustic emission data (34) that includes a bondline-proximate subset of the acoustic emission data (34) generated relatively proximate, or within, the bondline (90) and excludes a bondline-distal subset of the acoustic emission data (34) generated relatively distal, or external, the bondline (90).

E2. The acoustic evaluation system (10) of paragraph E1, wherein the validation structure (20) includes, or is, at least one of:

(i) a mechanical validation structure (20) configured to generate the validation condition in the form of a mechanical deformation force;

(ii) a pneumatic validation structure (20) configured to generate the validation condition in the form of a pneumatic deformation force;

(iii) a hydraulic validation structure (20) configured to generate the validation condition in the form of a hydraulic deformation force;

(iv) a pressure validation structure (20) configured to generate the validation condition in the form of a pressure deformation force; and (v) an energy application structure configured to generate the validation condition in the form of energy transmission through the structural assembly (80).

E3. The acoustic evaluation system (10) of any of paragraphs E1-E2, wherein the structural assembly (80) includes, or is, an aircraft canopy (94), and further wherein the validation structure (20) includes at least one of:

(i) an isolation structure (22) configured to fluidically isolate an interior region (96) of the aircraft canopy (94) from an exterior region (98) of the aircraft canopy (94); and (ii) a pressure differential generation structure (24) configured to generate a pressure differential between the interior region (96) of the aircraft canopy (94) and the exterior region (98) of the aircraft canopy (94).

E4. The acoustic evaluation system (10) of any of paragraphs E1-E3, wherein the plurality of acoustic sensors (32) is configured to be operatively attached to the structural assembly (80), optionally at least one of:

(i) via a sensor adhesive material (36); and (ii) via an acoustic transfer material (38), optionally wherein the acoustic transfer material (38) includes at least one of a grease, an oil, petroleum jelly, and mineral oil.

E5. The acoustic evaluation system (10) of any of paragraphs E1-E4, wherein the plurality of acoustic sensors (32) is spaced-apart and supported on a surface (92) of the structural assembly (80).

E6. The acoustic evaluation system (10) of any of paragraphs E1-E5, wherein the plurality of acoustic sensors (32) includes a bondline-proximate subset (40) of the plurality of acoustic sensors (32) that is relatively proximate the bondline (90) and a bondline-distal subset (42) of the plurality of acoustic sensors (32) that is relatively distal the bondline (90).

E7. The acoustic evaluation system (10) of paragraph E6, wherein the bondline-proximate subset of the acoustic emission data (34) includes acoustic emission data (34) initially detected by the bondline-proximate subset (40) of the plurality of acoustic sensors (32).

E8. The acoustic evaluation system (10) of any of paragraphs E6-E7, wherein the bondline-distal subset of the acoustic emission data (34) includes acoustic emission data (34) initially detected by the bondline-distal subset (42) of the plurality of acoustic sensors (32).

E9. The acoustic evaluation system (10) of any of paragraphs E1-E8, wherein the acoustic evaluation system (10) further includes a template (50) configured to facilitate accurate positioning of the plurality of acoustic sensors (32) at a corresponding plurality of spaced-apart sensing locations.

E10. The acoustic evaluation system (10) of any of paragraphs E1-E9, wherein the system further includes a sensor support structure (60) configured to retain the plurality of acoustic sensors (32) at least one of in acoustic communication with and in physical contact with the structural assembly (80), optionally wherein the sensor support structure is distinct from the structural assembly (80).

E11. The acoustic evaluation system (10) of any of paragraphs E1-E10, wherein the acoustic evaluation system (10) includes the structural assembly (80).

E12. The acoustic evaluation system (10) of paragraph E11, wherein the structural assembly (80) includes, or is, at least one of:

(i) a laboratory coupon;

(ii) a sub-assembly;

(iii) an assembled commercial component configured to be included within a commercial assembly; and (iv) an/the aircraft canopy (94) configured to be included within an aircraft (78), or a military aircraft.

E13. The acoustic evaluation system (10) of any of paragraphs E11-E12, wherein the structural assembly (80) includes, or is:

(i) a frame (82);

(ii) a transparency (86); and (iii) a structure adhesive (88) that adheres the transparency (86) to the frame (82) to define the bondline (90).

E14. The acoustic evaluation system (10) of paragraph E13, wherein the frame (82) defines a channel (84), wherein a region of the transparency (86) is received within the channel (84), and further wherein the structure adhesive (88) adheres the transparency to the frame (82) within the channel (84).

E15. The acoustic evaluation system (10) of paragraph E14, wherein the channel (84) surrounds the region of the transparency (86) on three sides.

E16. The acoustic evaluation system (10) of any of paragraphs E13-E14, wherein the frame (82) is defined by a frame material, wherein the transparency (86) is defined by a transparency material that differs from the frame material, and further wherein the structure adhesive (88) is defined by a structure adhesive material that differs from the frame material and also from the transparency material.

E17. The acoustic evaluation system (10) of paragraph E16, wherein the frame material includes, or is, a metallic frame material.

E18. The acoustic evaluation system (10) of any of paragraphs E16-E17, wherein the transparency material includes, or is, at least one of a polymeric transparency material, an acrylic transparency material, and a polycarbonate transparency material.

E19. The acoustic evaluation system (10) of any of paragraphs E16-E18, wherein the structure adhesive material includes, or is, at least one of a polymeric structure adhesive material and an epoxy structure adhesive material.

E20. The acoustic evaluation system (10) of any of paragraphs E1-E19, wherein the bondline (90) includes at least one of:

(i) an interface region between two dissimilar materials of the structural assembly (80); and (ii) an adhesion region between two dissimilar materials of the structural assembly (80).

E21. The acoustic evaluation system (10) of any of paragraphs E1-E20, wherein:

(i) the structural assembly (80) includes, or is, a baseline structural assembly (80);

(ii) the bondline (90) includes, or is, a baseline bondline (90);

(iii) the acoustic emission data (34) includes, or is, baseline acoustic emission data (34);

(iv) the filtered acoustic emission data (34) includes, or is, filtered baseline acoustic emission data (34);

(v) the bondline-proximate subset of the acoustic emission data (34) includes, or is, a baseline bondline-proximate subset; and (vi) the bondline-distal subset of the acoustic emission data (34) includes, or is, a baseline bondline-distal subset.

E22. The system of paragraph E21, wherein the analyzer module (70) further is programmed to at least one of:
(i) perform any suitable step and/or steps of any of the methods (100) of any of paragraphs A1-A32; and
(ii) control the operation of the acoustic evaluation system (10) according to any suitable step and/or steps of any of the methods (100) of any of paragraphs A1-A32.

E23. The acoustic evaluation system (10) of any of paragraphs E1-E20, wherein:
(i) the structural assembly (80) includes, or is, an assessment structural assembly (80);
(ii) the bondline (90) includes, or is, an assessment bondline (90);
(iii) the acoustic emission data (34) includes, or is, assessment acoustic emission data (34);
(iv) the filtered acoustic emission data (34) includes, or is, filtered assessment acoustic emission data (34);
(v) the bondline-proximate subset of the acoustic emission data (34) includes, or is, an assessment bondline-proximate subset; and
(vi) the bondline-distal subset of the acoustic emission data (34) includes, or is, an assessment bondline-distal subset.

E24. The acoustic evaluation system (10) of paragraph E23, wherein the analyzer module (70) further is programmed to at least one of:
(i) perform any suitable step and/or steps of any of the methods (200) of any of paragraphs B1-B33; and
(ii) control the operation of the system according to any suitable step and/or steps of any of the methods (200) of any of paragraphs B1-B33.

E25. The acoustic evaluation system (10) of any of paragraphs E1-E20, wherein:
(i) the structural assembly (80) includes, or is, a test structural assembly (80);
(ii) the bondline (90) includes, or is, a test bondline (90);
(iii) the acoustic emission data (34) includes, or is, test acoustic emission data (34);
(iv) the filtered acoustic emission data (34) includes, or is, filtered test acoustic emission
(v) the bondline-proximate subset of the acoustic emission data (34) includes, or is, a test bondline-proximate subset; and
(vi) the bondline-distal subset of the acoustic emission data (34) includes, or is, a test bondline-distal subset.

E26. The acoustic evaluation system (10) of paragraph E25, wherein the analyzer module (70) further is programmed to at least one of:
(i) perform any suitable step and/or steps of any of the methods (300) of any of paragraphs C1-C33; and
(ii) control the operation of the system according to any suitable step and/or steps of any of the methods (300) of any of paragraphs C1-C33.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of characterizing bondline integrity of structural assemblies, the method comprising:

for each baseline structural assembly of a plurality of baseline structural assemblies:

(i) receiving baseline acoustic emission data generated during validation of each baseline structural assembly, wherein each baseline structural assembly includes a corresponding baseline bondline, and further wherein at least a subset of the baseline acoustic emission data is generated during a physical change to the corresponding baseline bondline;

(i) filtering the baseline acoustic emission data to generate filtered baseline acoustic emission data that includes a baseline bondline-proximate subset of the baseline acoustic emission data generated relatively proximate the corresponding baseline bondline and excludes a baseline bondline-distal subset of the baseline acoustic emission data generated relatively distal the corresponding baseline bondline; and (iii) applying an unsupervised learning algorithm to the filtered baseline acoustic emission data to generate a classification dataset that identifies at least one characteristic of the filtered baseline acoustic emission data that is indicative of a physical change to the corresponding baseline bondline during validation of each baseline structural assembly.

2. The method of claim 1, wherein the receiving the baseline acoustic emission data includes generating the baseline acoustic emission data by applying a validation condition to each baseline structural assembly.

3. The method of claim 2, wherein the validation condition includes at least one of: solid wave propagation within each baseline structural assembly, energy transmission through each baseline structural assembly, mechanical energy transmission through each baseline structural assembly, thermal energy transmission through each baseline structural assembly, electrical energy transmission through each baseline structural assembly, a mechanically generated deformation force applied to each baseline structural assembly, a pneumatically generated deformation force applied to each baseline structural assembly, a hydraulically generated deformation force applied to each baseline structural assembly, and a pressure generated deformation force applied to each baseline structural assembly.

4. The method of claim 1, wherein the filtering the baseline acoustic emission data includes utilizing wave mechanics calculations to determine a plurality of emission locations within each baseline structural assembly, and for the baseline acoustic emission data, wherein the baseline bondline-proximate subset of the baseline acoustic emission data includes baseline acoustic emission data with bondline-proximate emission locations of the plurality of emission locations that are relatively proximate the corresponding baseline bondline, and further wherein the baseline bondline-distal subset of the baseline acoustic emission data includes baseline acoustic emission data with bondline-distal emission locations of the plurality of emission locations that are relatively distal the corresponding baseline bondline.

5. The method of claim 1, wherein:

(i) the baseline acoustic emission data is generated by a plurality of acoustic sensors in acoustic communication with each baseline structural assembly; and (ii) the receiving the baseline acoustic emission data includes generating the baseline acoustic emission data utilizing the plurality of acoustic sensors in acoustic communication with each baseline structural assembly.

6. The method of claim 5, wherein the plurality of acoustic sensors is spaced-apart and supported on a surface of each baseline structural assembly.

7. The method of claim 5, wherein the plurality of acoustic sensors includes a baseline bondline-proximate subset of the plurality of acoustic sensors that is relatively proximate the baseline bondline and a baseline bondline-distal subset of the plurality of acoustic sensors that is relatively distal the baseline bondline, wherein the baseline bondline-proximate subset of the baseline acoustic emission data includes baseline acoustic emission data initially detected by the baseline bondline-proximate subset of the plurality of acoustic sensors, and further wherein the baseline bondline-distal subset of the baseline acoustic emission data includes baseline acoustic emission data initially detected by the baseline bondline-distal subset of the plurality of acoustic sensors.

8. The method of claim 1, wherein the applying the unsupervised learning algorithm includes grouping the filtered baseline acoustic emission data to group filtered baseline acoustic emission data of the plurality of baseline structural assemblies that is indicative of similar bondline physical changes.

9. The method of claim 1, wherein the applying the unsupervised learning algorithm includes determining a frequency distribution function of the filtered baseline acoustic emission data, and further wherein the applying the unsupervised learning algorithm further includes clustering the frequency distribution function.

10. The method of claim 9, wherein the applying the unsupervised learning algorithm further includes training a supervised learning algorithm to analyze experimental acoustic emission data.

11. The method of claim 1, wherein:

(i) the plurality of baseline structural assemblies further includes at least one pristine baseline structural assembly that includes a corresponding pristine bondline;

(ii) the receiving the baseline acoustic emission data further includes receiving corresponding pristine acoustic emission data generated during validation of the pristine baseline structural assembly, wherein the pristine acoustic emission data is generated without degradation of the corresponding pristine bondline;

(iv) the filtered baseline acoustic emission data includes a baseline bondline-proximate subset of the corresponding pristine acoustic emission data and excludes a baseline bondline-distal subset of the corresponding pristine acoustic emission data; and (v) the classification dataset further identifies at least one characteristic of the filtered baseline acoustic emission data that is indicative of validation of at least one pristine baseline structural assembly without degradation of the corresponding pristine bondline.

12. The method of claim 1, wherein each baseline structural assembly includes at least one of:

(i) a laboratory coupon;

(ii) a sub-assembly;

(iii) an assembled commercial component configured to be included within a commercial assembly; and (iv) an aircraft canopy configured to be included within an aircraft.

13. The method of claim 1, wherein each baseline structural assembly includes:

(i) a frame;

(ii) a transparency; and (iii) a structural adhesive that adheres the transparency to the frame to define the corresponding baseline bondline.

14. The method of claim 1, wherein the corresponding baseline bondline includes at least one of:

(i) an interface region between two dissimilar materials of each baseline structural assembly; and (ii) an adhesion region between two dissimilar materials of each baseline structural assembly.

15. The method of claim 1, wherein the physical change to the corresponding baseline bondline includes at least one of:

(i) deformation of the corresponding baseline bondline;

(ii) damage initiation within the corresponding baseline bondline; and (iii) damage growth within the corresponding baseline bondline.

16. The method of claim 1, wherein the physical change to the corresponding baseline bondline includes degradation of the corresponding baseline bondline.

17. Non-transitory computer-readable storage media including computer-executable instructions that, when executed, direct an analyzer module to perform the method of claim 1.

18. An acoustic evaluation system for acoustically evaluating a structural assembly that includes a bondline, the acoustic evaluation system comprising:

a validation structure configured to apply a validation condition to the structural assembly;

an acoustic sensing system including a plurality of acoustic sensors configured to be positioned in acoustic communication with the structural assembly and to generate acoustic emission data indicative of acoustic emissions from the structural assembly during validation of the structural assembly via the validation condition; and an analyzer module programmed to receive the acoustic emission data and to filter the acoustic emission data to generate filtered acoustic emission data that includes a bondline-proximate subset of the acoustic emission data generated relatively proximate the bondline and excludes a bondline-distal subset of the acoustic emission data generated relatively distal the bondline.

19. A method of establishing a reduced proof pressure differential for proof testing of a structural assembly that includes a bondline, the method comprising:

establishing an assessment pressure differential between an interior region of an assessment structural assembly and an exterior region of the assessment structural assembly;

during the establishing the assessment pressure differential, acoustically monitoring the assessment structural assembly to generate assessment acoustic emission data;

filtering the assessment acoustic emission data to generate filtered assessment acoustic emission data that includes an assessment bondline-proximate subset of the assessment acoustic emission data and excludes an assessment bondline-distal subset of the assessment acoustic emission data;

applying a supervised learning algorithm trained on a classification dataset to the filtered assessment acoustic emission data to identify characteristics of the filtered assessment acoustic emission data indicative of a physical change to an assessment bondline of the assessment structural assembly;

repeating the establishing, the acoustically monitoring, the filtering, and the applying at a plurality of distinct assessment pressure differentials to generate a proof pressure differential database that includes each assessment pressure differential of the plurality of distinct assessment pressure differentials and correspondingly identified characteristics of corresponding filtered assessment acoustic emission data indicative of the physical change to the assessment bondline; and selecting the reduced proof pressure differential for the structural assembly based, at least in part, on the proof pressure differential database.

20. A method of proof testing a test structural assembly, which includes a test bondline, at a reduced proof pressure differential, the method comprising:

establishing the reduced proof pressure differential between an interior region of the test structural assembly and an exterior region of the test structural assembly;

during the establishing the reduced proof pressure differential, acoustically monitoring the test structural assembly to generate test acoustic emission data;

filtering the test acoustic emission data to generate filtered test acoustic emission data that includes a test bondline-proximate subset of the test acoustic emission data and excludes a test bondline-distal subset of the test acoustic emission data;

applying a supervised learning algorithm trained on a classification dataset to the filtered test acoustic emission data to identify characteristics of the filtered test acoustic emission data indicative of a physical change to the test bondline; and predicting the physical change to the test bondline when the filtered test acoustic emission data includes characteristics indicative of the physical change to the test bondline.

* * * * *